(12) United States Patent
Tsunoda et al.

(10) Patent No.: US 12,523,818 B2
(45) Date of Patent: Jan. 13, 2026

(54) OPTICAL CONNECTOR MODULE AND METHOD OF MANUFACTURING OPTICAL WAVEGUIDE BOARD

(71) Applicant: KYOCERA CORPORATION, Kyoto (JP)

(72) Inventors: Masatoshi Tsunoda, Machida (JP); Takahiro Suzuki, Yamato (JP); Mitsuaki Tounoo, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 69 days.

(21) Appl. No.: 18/666,633

(22) Filed: May 16, 2024

(65) Prior Publication Data

US 2024/0302596 A1    Sep. 12, 2024

Related U.S. Application Data

(63) Continuation of application No. 17/425,289, filed as application No. PCT/JP2020/001610 on Jan. 17, 2020, now Pat. No. 12,019,276.

(30) Foreign Application Priority Data

Jan. 24, 2019  (JP) .................................. 2019-010561

(51) Int. Cl.
*G02B 6/42* (2006.01)
*G02B 6/30* (2006.01)
*G02B 6/38* (2006.01)

(52) U.S. Cl.
CPC ............. *G02B 6/30* (2013.01); *G02B 6/4228* (2013.01); *G02B 6/423* (2013.01); *G02B 6/3897* (2013.01)

(58) Field of Classification Search
CPC .............................. G02B 6/4228; G02B 6/423
See application file for complete search history.

(56) References Cited

U.S. PATENT DOCUMENTS 9,008,477 B2   4/2015  Numata
10,495,827 B2  12/2019  Tsunoda et al.
(Continued)

FOREIGN PATENT DOCUMENTS

JP   H09230167 A   9/1997
JP   2004037776 A   2/2004
(Continued)

*Primary Examiner* — Charlie Y Peng
(74) *Attorney, Agent, or Firm* — Duane Morris LLP

(57) ABSTRACT

An optical connector module (1) according to the present disclosure includes an optical waveguide board (10) and an optical connector (20) attached to the optical waveguide board (10). The optical connector (20) includes a positioning target portion (23) that engages with the optical waveguide board (10), and the optical connector (20) is positioned relative to the optical waveguide board (10) in a state in which the positioning target portion (23) is engaged with the optical waveguide board (10). The optical waveguide board (10) includes an optical waveguide (12) including a first cladding (122a) and a core (121) stacked on the first cladding (122a), the first cladding being stacked on a substrate (11) in a stacking direction perpendicular to the substrate (11), and a positioning core (14) that is stacked on the first cladding (122a) by using a material the same as a material of the core (121) and that engages with the positioning target portion (23). The positioning core (14) protrudes further than the core (121) toward a side opposite to the substrate (11) in the stacking direction.

5 Claims, 19 Drawing Sheets

(56) References Cited

U.S. PATENT DOCUMENTS

2005/0238292 A1* 10/2005 Barnes ................ G02B 6/3846
 385/78
2009/0162004 A1  6/2009 Johnson et al.
2015/0045645 A1*  2/2015 Eberle ................ A61B 1/00165
 600/407

FOREIGN PATENT DOCUMENTS

| JP | 5156502 B2 | 3/2013 |
| JP | 2014081586 A | 5/2014 |
| KR | 20130065476 A | 6/2013 |
| WO | 2017212861 A1 | 12/2017 |

* cited by examiner

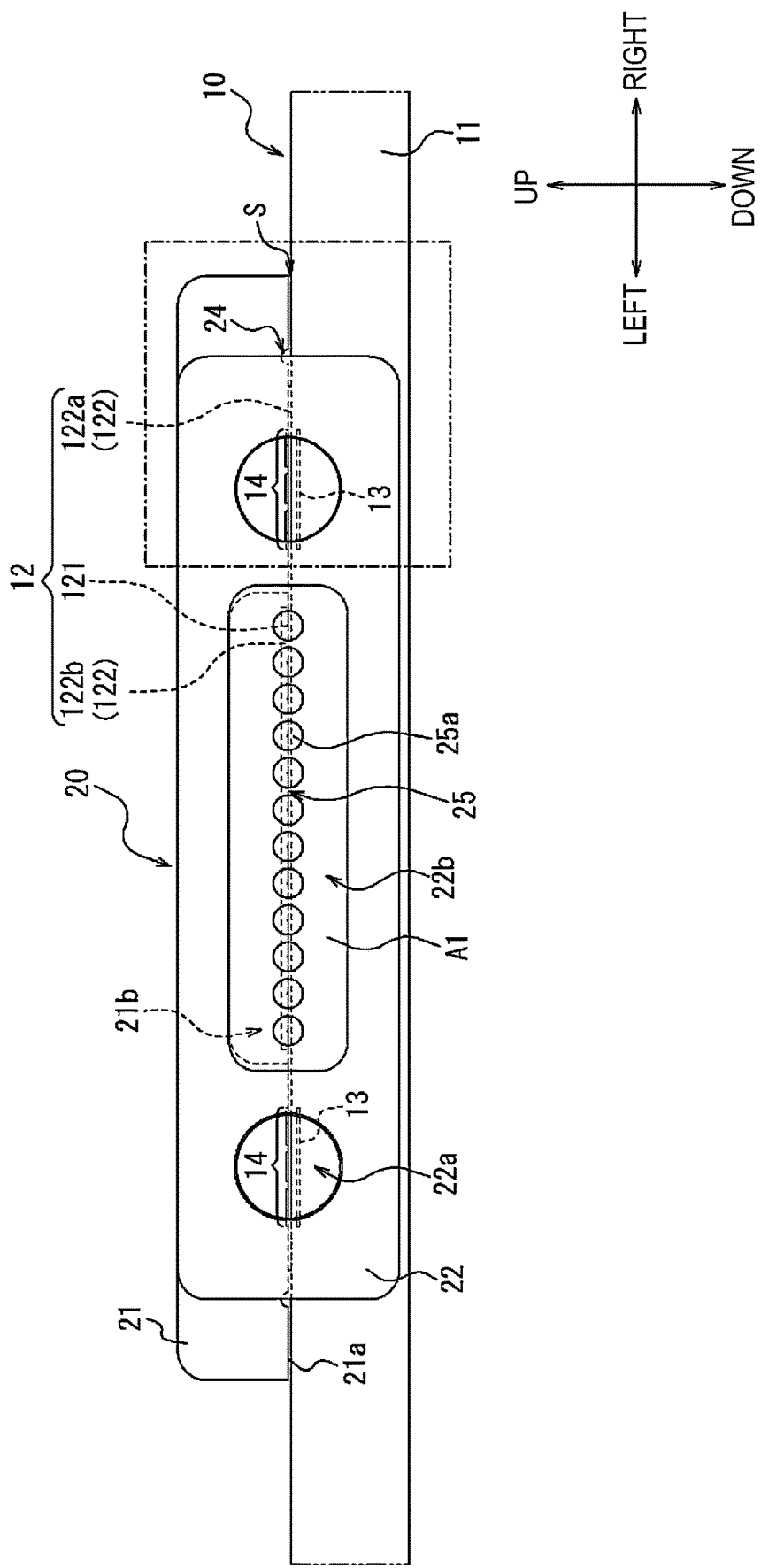

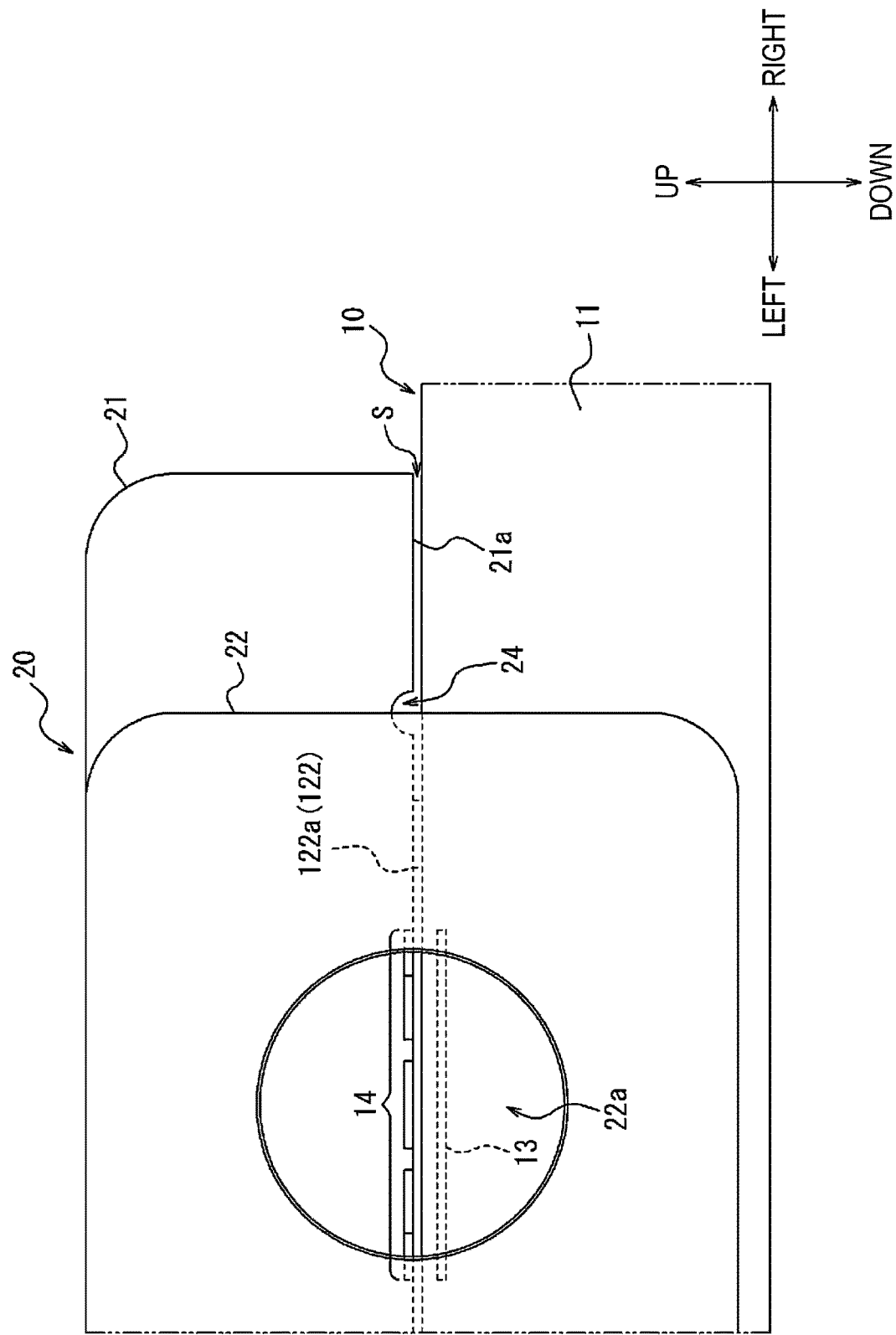

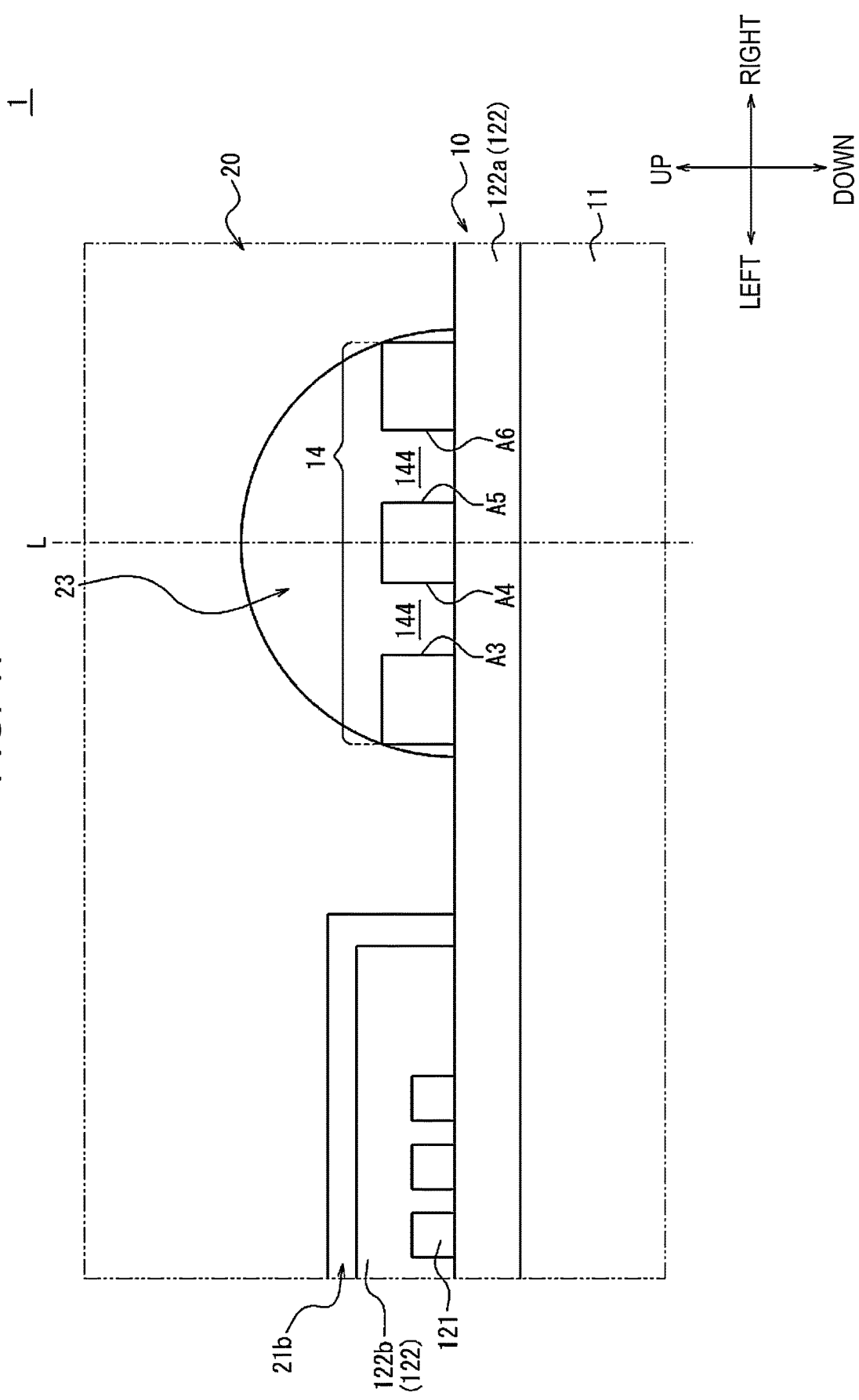

OPTICAL CONNECTOR MODULE AND METHOD OF MANUFACTURING OPTICAL WAVEGUIDE BOARD

CROSS-REFERENCE TO RELATED APPLICATIONS

The present application is a continuation of U.S. patent application Ser. No. 17/425,289, filed on Jul. 22, 2021, which is a 371 of International Application No. PCT/JP2020/001610, filed on Jan. 17, 2020, which claims priority of Japanese Patent Application No. 2019-010561, filed on Jan. 24, 2019, the entire disclosure of each is incorporated herein by reference.

TECHNICAL FIELD

The present disclosure relates to an optical connector module and a method of manufacturing an optical waveguide board.

BACKGROUND ART

An optical connector module for optically coupling an optical waveguide included in an optical waveguide board to another optical transmission line is known. For example, PTL 1 discloses an optical connector module that includes an optical waveguide board including a positioning projection that is stacked on a lower cladding layer of an optical waveguide in parallel with a core of the optical waveguide.

CITATION LIST

Patent Literature

PTL 1: U.S. Patent Application Publication No. 2009/0162004 (US, A1)

SUMMARY OF INVENTION

An optical connector module according to an embodiment of the present disclosure is
an optical connector module including an optical waveguide board and an optical connector attached to the optical waveguide board.
The optical connector includes:
a positioning target portion that engages with the optical waveguide board; and
the optical connector is positioned relative to the optical waveguide board in a state in which the positioning target portion is engaged with the optical waveguide board.
The optical waveguide board includes
an optical waveguide including a first cladding and a core stacked on the first cladding, the first cladding being stacked on a substrate in a stacking direction perpendicular to the substrate, and
a positioning core that is stacked on the first cladding by using a material the same as a material of the core and that engages with the positioning target portion.
The positioning core protrudes further than the core toward a side opposite to the substrate in the stacking direction.
A method of manufacturing an optical waveguide board according to an embodiment of the present disclosure is
a method of manufacturing an optical waveguide board to which an optical connector is to be attached.

The method includes:
a first step of stacking a cladding of an optical waveguide on a substrate in a staking direction perpendicular to the substrate; and
a second step of stacking a core of the optical waveguide and a positioning core on the cladding by using materials that are the same as each other, the positioning core to be engaged with a positioning target portion of the optical connector to position the optical connector relative to the optical waveguide board.
In the second step, the positioning core is formed so as to protrude further than the core toward a side opposite to the substrate in the stacking direction.

BRIEF DESCRIPTION OF DRAWINGS

FIG. 15 is a front view of the optical connector module shown in FIG. 12.

FIG. 16 is an enlarged view of a region surrounded by an alternate long and short dash line in FIG. 15.

FIG. 17 is an enlarged front sectional view schematically illustrating a part of the optical connector module shown in FIG. 12.

DESCRIPTION OF EMBODIMENTS

In order to optically couple an optical waveguide to another optical transmission line efficiently, in general, it is necessary to align the positions of the optical waveguide and the other optical transmission line with each other with a precision of the order of micrometers. Accordingly, accuracy of the same order is required for positioning an optical connector of an optical connector module, which is to be connected to a connector that holds another optical transmission line, relative to an optical waveguide board. With the optical connector module including the optical waveguide board described in PTL 1, the accuracy in positioning the optical connector relative to the optical waveguide board is not sufficient.

An embodiment of the present disclosure provides an optical connector module and a method of manufacturing an optical waveguide board with which the accuracy in positioning an optical connector relative to an optical waveguide board is improved.

Hereafter, an embodiment of the present disclosure will be described in detail with reference to the drawings. The front-back, the left-right, and the up-down directions in the following description are defined as the directions of arrows in the figures. The directions of arrows in different figures are consistent with each other.

The "stacking direction" used in the following description includes, for example, the up-down direction. The "extension direction of a core" includes, for example, the front-back direction. The "direction perpendicular to the stacking direction" includes, for example, the left-right direction. The "side opposite to the substrate" includes, for example, the upper side.

First Embodiment

Figure 1:
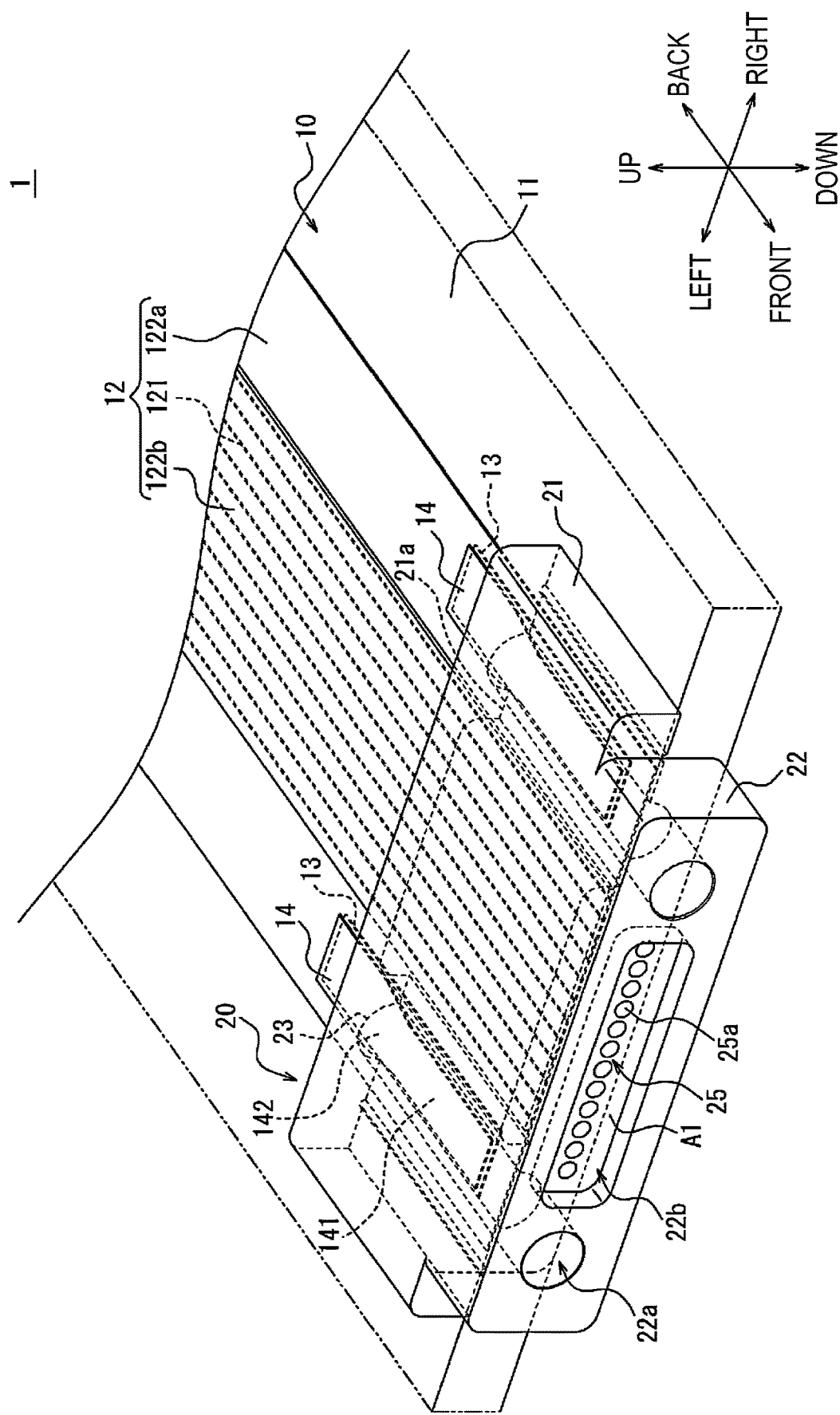
FIG. 1 is a perspective view of an optical connector module according to a first embodiment.
Figure 2:
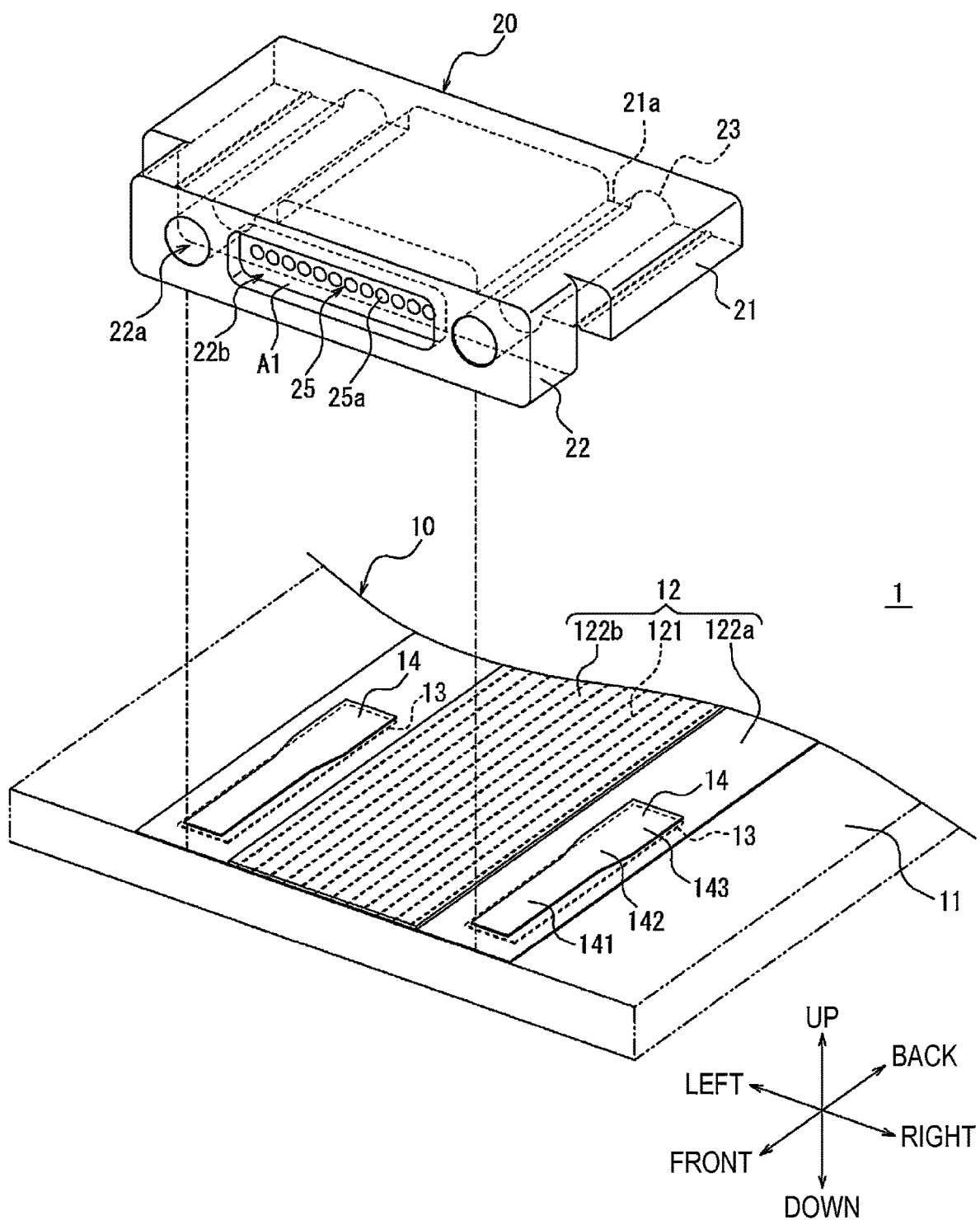
FIG. 2 is an exploded perspective view of the optical connector module shown in FIG. 1.

Referring to FIGS. 1 to 11C, a first embodiment of the present disclosure will be mainly described. FIG. 1 is a perspective view of an optical connector module 1 according to the first embodiment. FIG. 2 is an exploded perspective view of the optical connector module 1 shown in FIG. 1. The optical connector module 1 includes an optical waveguide board 10 and an optical connector 20 attached to the optical waveguide board 10.

Figure 3:
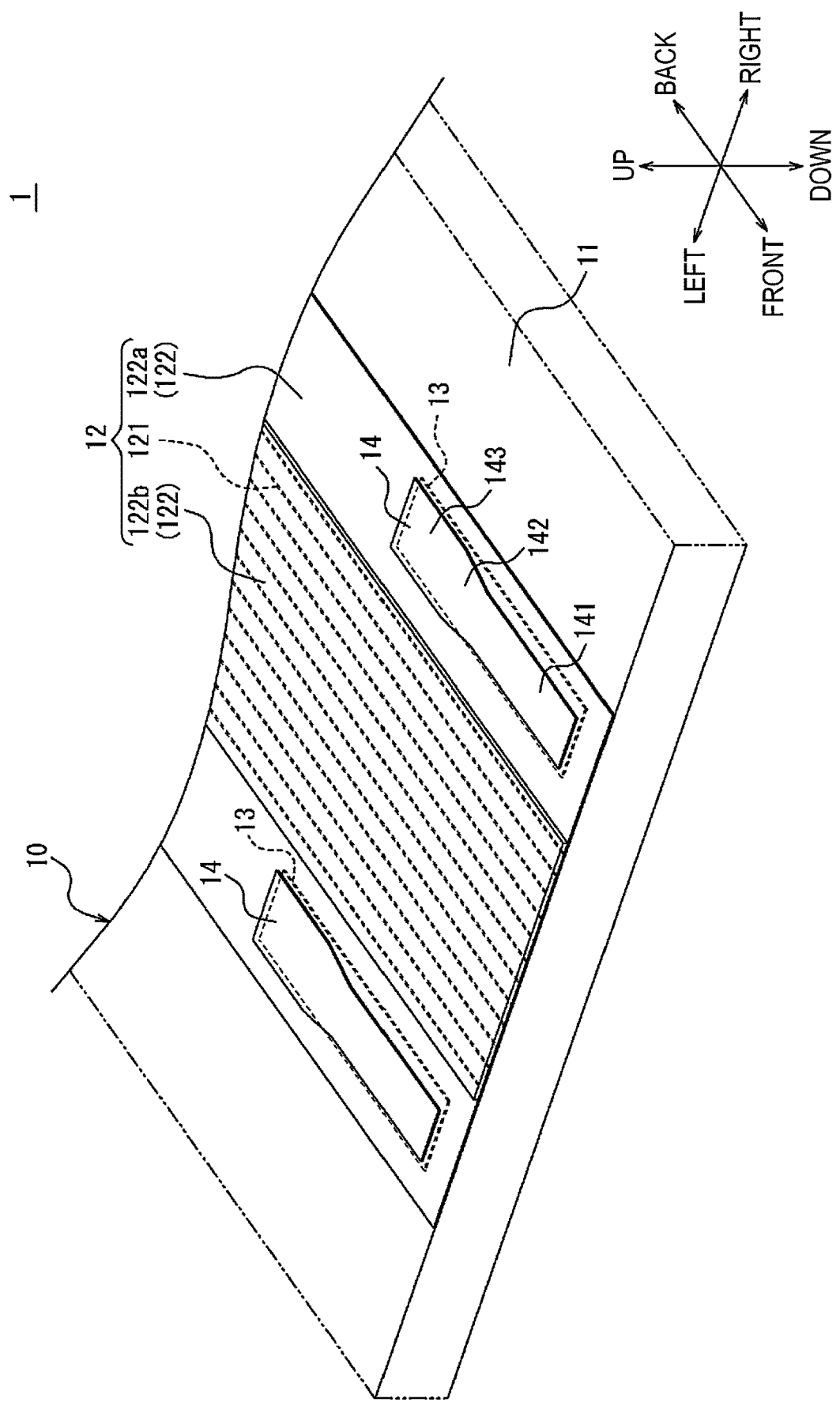
FIG. 3 is a perspective view of only an optical waveguide board shown in FIG. 2.

FIG. 3 is a perspective view of only the optical waveguide board 10 shown in FIG. 2. Referring to FIG. 3, the configuration of the optical waveguide board 10 shown in FIG. 2 will be mainly described.

The optical waveguide board 10 includes, for example, a substrate 11 that is constituted by a rigid printed wiring substrate and an optical waveguide 12 that is stacked on an upper surface of the substrate 11. The optical waveguide 12 is formed, for example, so as to protrude from the upper surface of the substrate 11. The optical waveguide 12 is formed, for example, in order to be optically coupled to the optical connector 20, so that a front end surface thereof coincides with a front end surface of the substrate 11. The front end surface of the optical waveguide 12 has, for example, a flat shape along the front end surface of the substrate 11. The waveguide mode of the optical waveguide 12 is, for example, a single mode. The waveguide mode of the optical waveguide 12 is not limited to this, and may be a multi-mode. In the following description, it is assumed that the optical waveguide 12 is formed on the upper surface of the substrate 11. However, the position of the optical waveguide 12 is not limited to this. For example, the optical waveguide 12 may be embedded in the substrate 11. In this case, the front end surface of the optical waveguide 12 may be formed so that the front end surface coincides with the front end surface of the substrate 11 and so that end surfaces of cores 121 described below are exposed from the substrate 11.

The optical waveguide 12 includes the cores 121 and a cladding 122 that are stacked on the substrate 11 in the stacking direction perpendicular to the substrate 11. To be more specific, the optical waveguide 12 includes a first cladding 122a stacked on the upper surface of the substrate 11, the cores 121 stacked on the first cladding 122a, a second cladding 122b that is disposed so that the cores 121 are interposed between the second cladding 122b and the first cladding 122a in the stacking direction and that surrounds the cores 121.

The cores 121 are formed so as to be separated from each other by predetermined distances in the left-right direction. The cores 121 and the cladding 122 are each made of, for example, an appropriate material such as quartz glass. The refractive index of each core 121 is higher than the refractive index of the cladding 122. In the following description, it is assumed that the optical waveguide 12 is, for example, an embedded optical waveguide. However, the optical waveguide 12 is not limited to this. The optical waveguide 12 may be an optical waveguide of any appropriate type, such as a slab optical waveguide or a semi-embedded optical waveguide.

The optical waveguide board 10 includes heat conductors 13 that are embedded in the substrate 11 along positioning cores 14 described below. To be more specific, each heat conductor 13 is embedded in the substrate 11 along the entire width of a corresponding one of the positioning cores 14 in the front-back and left-right directions. The heat conductor 13 is embedded in the substrate 11 directly below the positioning core 14 so as to extend parallel to the positioning core 14 in the front-back direction. The heat conductor 13 may be a single copper plate that is embedded in the substrate 11 directly below the positioning core 14, or may be a plurality of copper wires that are embedded in the substrate 11 directly below the positioning core 14 and that extend parallel to each other. The material of the heat conductor 13 is not limited to copper and may be any appropriate material having high thermal conductivity.

The optical waveguide board 10 further includes the positioning cores 14 that are stacked on the substrate 11 by using a material the same as the material of the core 121. The positioning cores 14 are stacked on the first cladding 122a. The positioning cores 14 are formed, for example, in a pair so that the optical waveguide 12 is interposed therebetween in the left-right direction. Each positioning core 14 is formed, for example, parallel to the optical waveguide 12 in the front-back direction. The positioning core 14 is each formed, for example, so as to extend by a predetermined length in the front-back direction.

Each positioning core 14 includes a small-width portion 141 that constitutes a front half part of the positioning core 14 and that has a rectangular shape in a top view. The positioning core 14 includes an engagement portion 142 that is formed so as to be continuous backward from the small-width portion 141 and that has a trapezoidal shape in a top view that gradually becomes wider from the front toward the back. The positioning core 14 includes a large-width portion 143 that is formed so as to be continuous backward from the engagement portion 142, the has a larger width in the left-right direction than the small-width portion 141, and that has a rectangular shape in a top view.

Each positioning core 14 and each core 121 are separated from the heat conductor 13. The distance between the positioning core 14 and the heat conductor 13 is smaller than the distance between the core 121 and the heat conductor 13. In a process of manufacturing the optical waveguide board 10 described below, a heat amount based on heat applied to the optical waveguide board 10 differs between the positioning core 14 and the core 121 due to the effect of the distance from the heat conductor 13. To be more specific, when a heat amount received by the positioning core 14 and a heat amount received by the core 121 in the manufacturing process are compared, the heat amount in the positioning core 14 is smaller than the heat amount in the core 121, because the distance the positioning core 14 and the heat conductor 13 is smaller than the distance between the core 121 and the heat conductor 13. Thus, under the same environment in the process of manufacturing the optical waveguide board 10, the temperature of the positioning core 14 tends to become lower than the temperature of the core 121.

Figure 4:
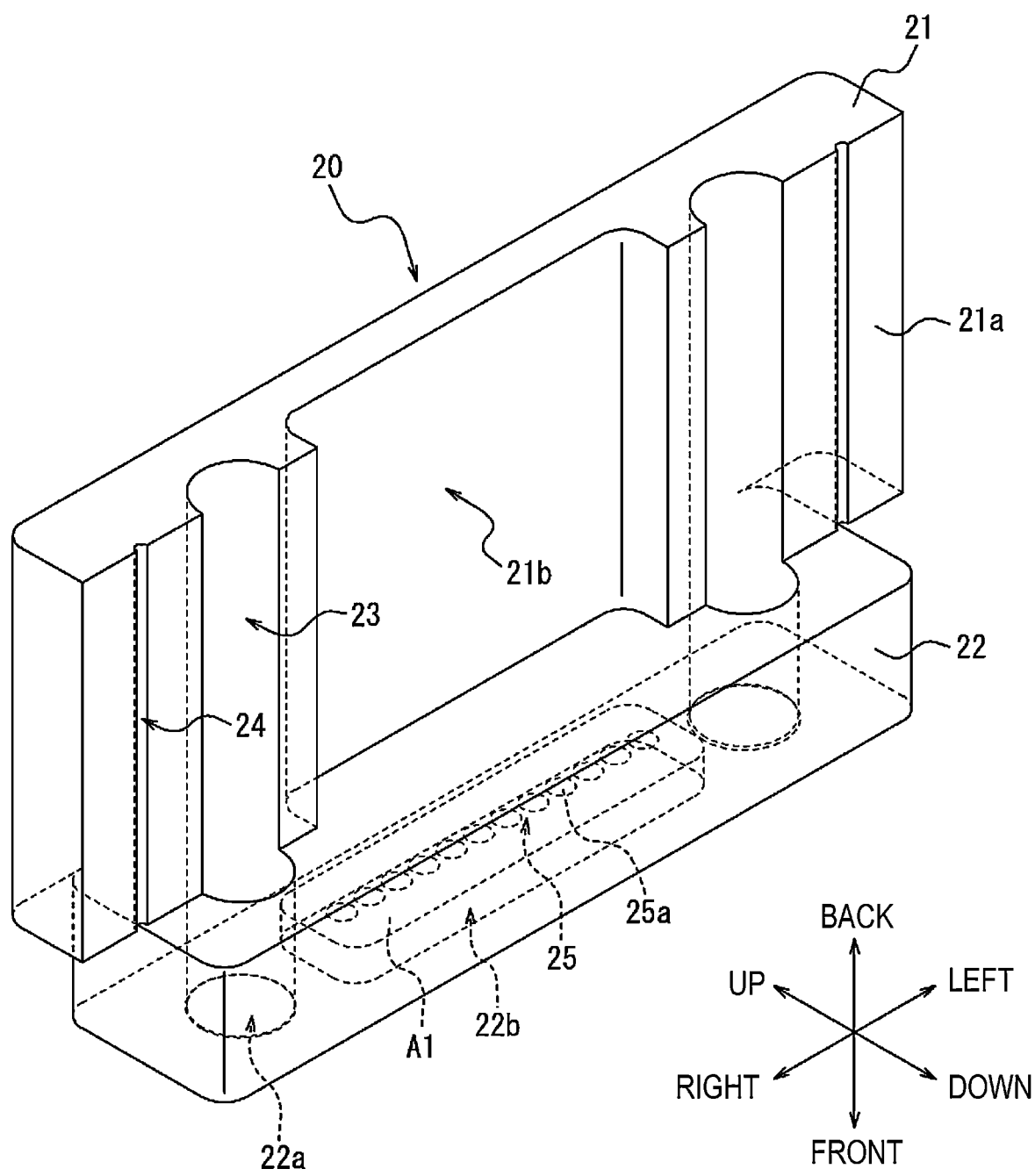
FIG. 4 is a perspective view of only an optical connector shown in FIG. 2.

FIG. 4 is a perspective view of only the optical connector 20 shown in FIG. 2. Referring to FIG. 4, the configuration of the optical connector 20 shown in FIG. 2 will be mainly described.

The optical connector 20 is made of, for example, a light-transmissive resin material. For example, the optical connector 20 is made of a material having a refractive index that is substantially the same as the refractive index of the core 121 of the optical waveguide 12. The optical connector 20 has an L-shape. The optical connector 20 includes a first base member 21 that extends in the front-back direction. The first base member 21 includes a recessed portion 21*b* that is recessed inward from a central part of a lower surface 21*a*. The optical connector 20 includes a second base member 22 that protrudes forward from the first base member 21 and that is formed to be continuous from the first base member 21. The second base member 22 is formed so as to jut out downward from the first base member 21. The optical connector 20 includes a pair of through-holes 22*a* that extend through the second base member 22 from the front surface to the back surface of the second base member 22 and each of which has a circular shape in a sectional view. The pair of through-holes 22*a* are formed in left and right end portions of the second base member 22 in such a way that the recessed portion 21*b* of the first base member 21 is interposed therebetween in the left-right direction. The optical connector 20 includes a recessed portion 22*b* that is recessed by one step inward from the front surface of the second base member 22.

The optical connector 20 includes a pair of positioning target portions 23 that are formed in the lower surface 21*a* of the first base member 21 on the left and right outer sides of the recessed portion 21*b* in such a way that the recessed portion 21*b* is interposed therebetween in the left-right direction. The positioning target portions 23 are, for example, recessed portions each of which has a semicircular shape in a sectional view. The positioning target portions 23 are formed to be continuous from the through-holes 22*a* of the second base member 22 to the back end of the first base member 21. The through-holes 22*a* and the positioning target portions 23 have circular shapes that are concentric with each other. The positioning target portions 23 extend parallel to the recessed portion 21*b* in the front-back direction.

The optical connector 20 includes a pair of accommodation portions 24 that are formed in the lower surface 21*a* of the first base member 21 on the left and right outer sides of the positioning target portions 23 in such a way that the recessed portion 21*b* and the positioning target portions 23 are interposed therebetween in the left-right direction. The accommodation portions 24 are, for example, recessed portions each of which has a semicircular shape in a sectional view. The radius of the semicircle of each accommodation portion 24 in a sectional view is, for example, sufficiently smaller than the radius of the semicircle of each positioning target portion 23 in a sectional view. The accommodation portions 24 are, for example, formed to be continuous from the front end to the back end of the first base member 21. The accommodation portions 24 extend, for example, in the extension direction of the cores 121 perpendicular to the stacking direction. The accommodation portions 24 extend, for example, parallel to the recessed portion 21*b* and the positioning target portions 23 in the front-back direction.

The optical connector 20 includes a lens portion 25 that is provided in a front surface A1 of the recessed portion 22*b*. The lens portion 25 is constituted by a plurality of lenses 25*a* each having a curvature. The number of the lenses 25*a* of the lens portion 25 corresponds to the number of the cores 121 of the optical waveguide 12.

The optical connector 20 is to be optically coupled to the optical waveguide 12 included in the optical waveguide board 10. To be more specific, the second base member 22 of the optical connector 20, for example, transmits light emitted from the cores 121 of the optical waveguide 12 and guides the light to the lenses 25*a*. The light that has passed through the lenses 25*a* is emitted from the optical connector 20 and becomes coupled to another optical transmission line that is held by a connector connected to the optical connector 20. Conversely, the lenses 25*a* of the second base member 22 of the optical connector 20 transmit light emitted from the other optical transmission line that is held by the connector connected to the optical connector 20. The light that has passed through the lenses 25*a* passes through the second base member 22 and enters the cores 121 of the optical waveguide 12.

As illustrated in FIGS. 1 and 2, the optical connector 20 is placed, for example, on the optical waveguide 12 from above the optical waveguide board 10. To be more specific, the optical connector 20 is placed on the first cladding 122*a* as the lower surface 21*a* of the first base member 21 comes into contact with the upper surface of the first cladding 122*a* of the optical waveguide 12. At this time, the small-width portion 141 of each positioning core 14 is accommodated within the width of a corresponding one of the positioning target portions 23 of the optical connector 20 in the left-right direction. The optical connector 20 is slightly pushed backward from this state, and a back end portion of the positioning target portions 23 come into contact with the engagement portions 142 of the positioning cores 14. Thus, the positioning cores 14 and the positioning target portions 23 engage with each other.

In the state in which the positioning target portions 23 are engaged with the positioning cores 14, the optical connector 20 is positioned relative to the optical waveguide board 10. To be more specific, the position of the optical connector 20 in the up-down direction relative to the optical waveguide board 10 is determined based on contact of the lower surface 21a of the first base member 21 with the upper surface of the first cladding 122a of the optical waveguide 12. The position of the optical connector 20 relative to the optical waveguide board 10 in the front-back and left-right directions is determined based on the engagement of the positioning target portions 23 of the first base member 21 with the positioning cores 14 of the optical waveguide board 10.

Figure 5:
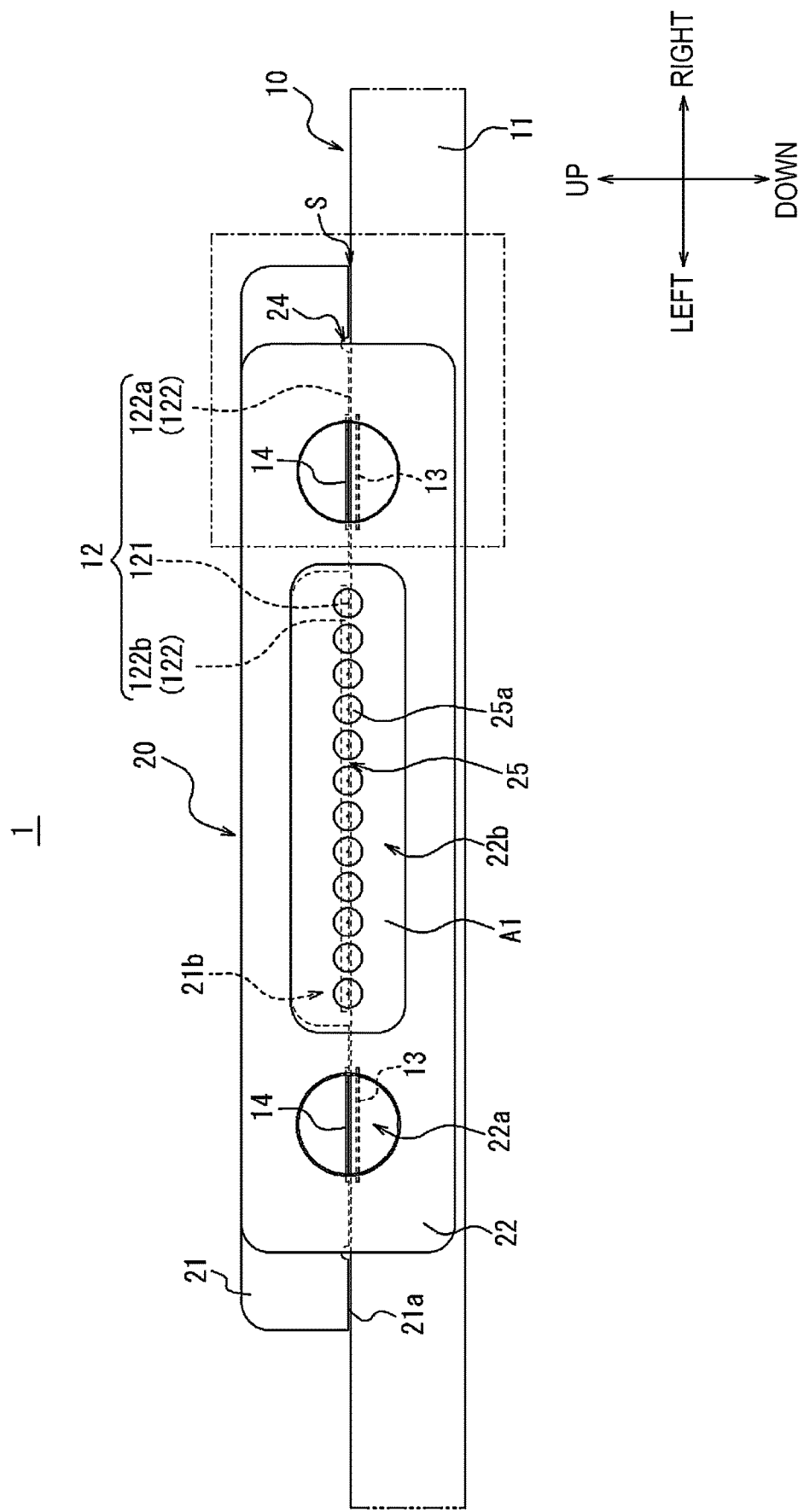
FIG. 5 is a front view of the optical connector module shown in FIG. 1.

FIG. 5 is a front view of the optical connector module 1 shown in FIG. 1. As illustrated in FIG. 5, when the optical connector 20 is positioned relative to the optical waveguide board 10, front end portions of the cores 121 of the optical waveguide 12 and the second cladding 122b are accommodated in the recessed portion 21b of the first base member 21. The optical connector 20 is disposed in a state in which the lower surface 21a of the first base member 21 is in contact with the upper surface of the first cladding 122a and covers a part of the optical waveguide 12. The second base member 22 is disposed so as to protrude forward from the front end surface of the substrate 11 and jut out downward from the first base member 21. The second base member 22 protrudes so that the lower surface thereof is located below the up-down position of the optical waveguide 12 and located above the lower surface of the substrate 11. The lenses 25a of the lens portion 25, which is formed in the second base member 22, respectively face the cores 121 of the optical waveguide 12.

Figure 6:
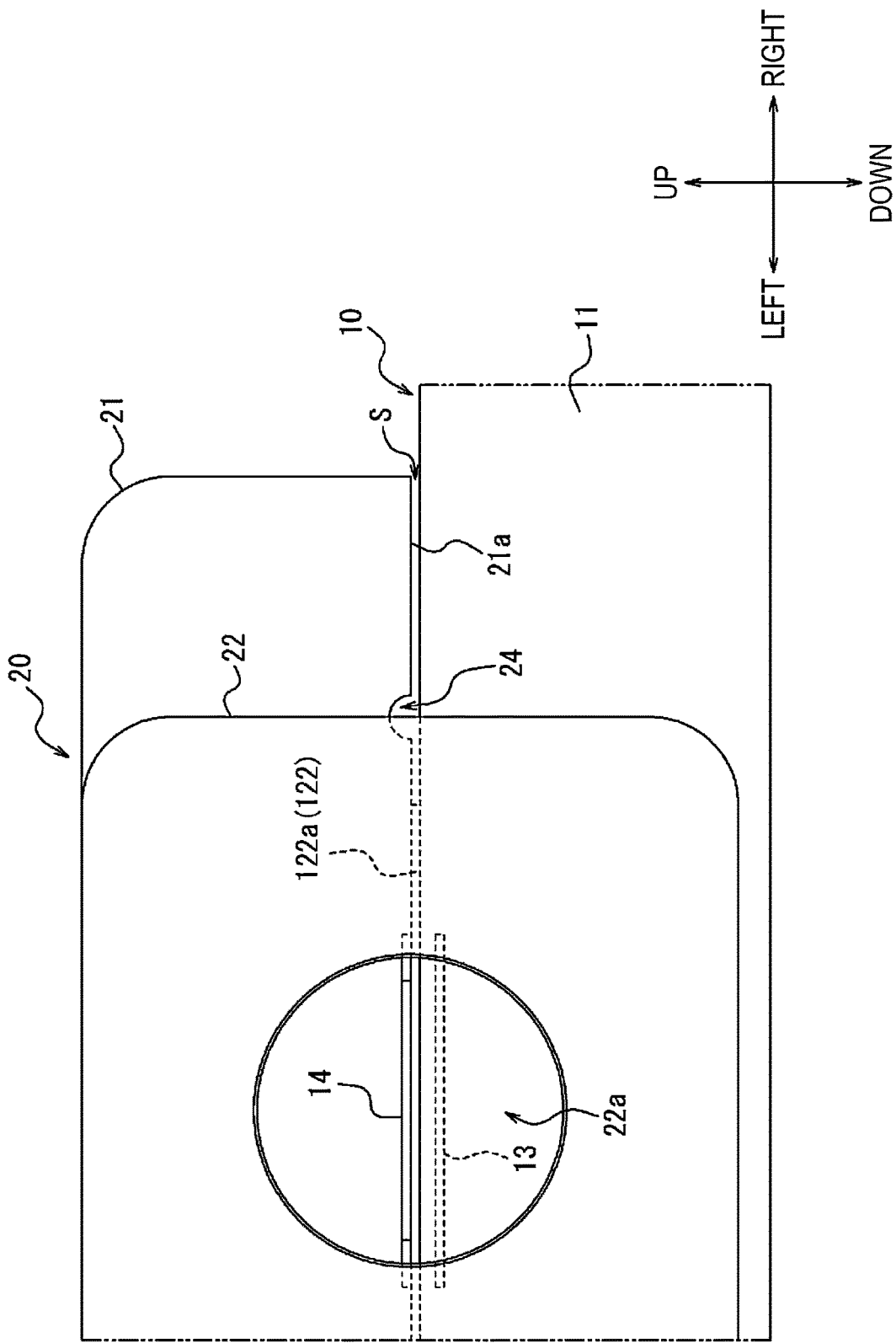
FIG. 6 is an enlarged view of a region surrounded by an alternate long and short dash line in FIG. 5.

FIG. 6 is an enlarged view of a region surrounded by an alternate long and short dash line in FIG. 5. As illustrated in FIG. 6, the accommodation portion 24 of the optical connector 20 is formed outside, along the substrate 11, of the positioning target portion 23, which is engaged with the positioning core 14. The first cladding 122a of the optical waveguide 12 has a slightly smaller width in the left-right direction than the lower surface 21a of the first base member 21 of the optical connector 20. To be more specific, the width of the first cladding 122a in the left-right direction is smaller than the distance between the pair of left and right accommodation portions 24 and larger than the distance between the pair of left and right positioning target portions 23, which are engaged with the positioning cores 14. Accordingly, the left and right ends of the lower surface 21a, which respectively include the pair of left and right accommodation portions 24, are not in contact with the first cladding 122a and face the upper surface of the substrate 11 in a state of being separated from the upper surface of the substrate 11. The accommodation portions 24, which are formed in the lower surface 21a, face the substrate 11. A space S is formed between each of the left and right ends of the lower surface 21a, which respectively include the pair of left and right accommodation portions 24, and the upper surface of the substrate 11.

Figure 7:
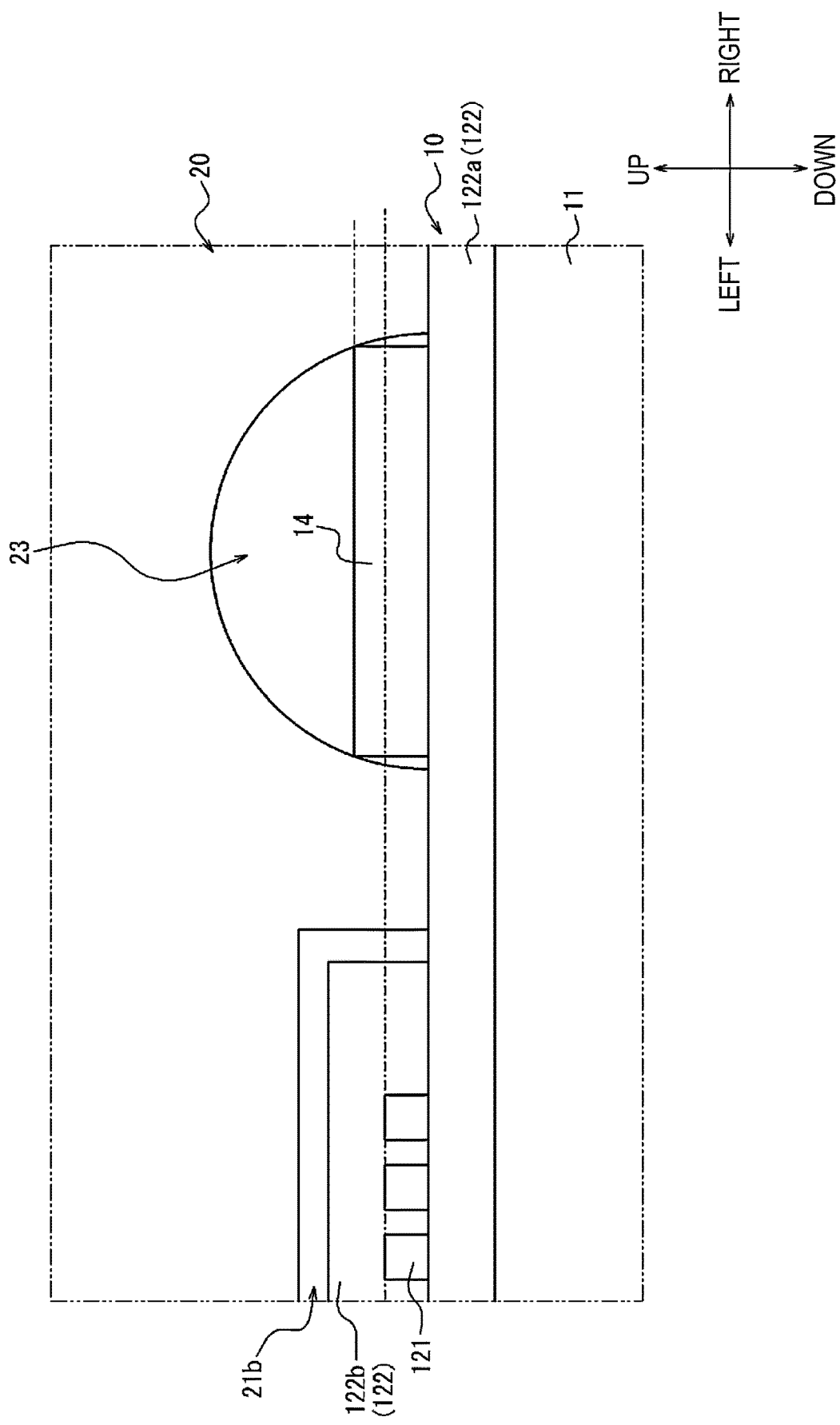
FIG. 7 is an enlarged front sectional view schematically illustrating a part of the optical connector module shown in FIG. 1.

FIG. 7 is an enlarged front sectional view schematically illustrating a part of the optical connector module 1 shown in FIG. 1. In FIG. 7, the structural relationship between each core 121 of the optical waveguide 12 and the positioning core 14 is illustrated. As illustrated in FIG. 7, in the optical connector module 1 shown in FIG. 1, the positioning core 14 is stacked on the first cladding 122a so that the volume of the positioning core 14 is larger than that of the core 121 of the optical waveguide 12. To be more specific, the positioning core 14 is stacked on the first cladding 122a so that the up-down width of the positioning core 14 is larger than that of the core 121 of the optical waveguide 12. The positioning core 14 protrudes further than the core 121 of the optical waveguide 12 toward a side opposite to the substrate 11 in the stacking direction. Likewise, the positioning core 14 is stacked on the first cladding 122a so that the left-right width of the positioning core 14 is larger than that of the core 121 of the optical waveguide 12.

In general, with an existing method of manufacturing an optical waveguide board, when a core and a positioning core are formed in the same manufacturing process, top end surfaces thereof, that is, upper surfaces thereof are uniformly formed to have heights that are the same as each other. However, the upper surface of the positioning core 14 of the optical connector module 1 according to the first embodiment differs from that of the common sense of existing technology, and is formed so as to be positioned further than the upper surface of the core 121 toward a side opposite to the substrate 11 in the stacking direction.

The optical waveguide board 10 according to the first embodiment is manufactured, for example, by using photolithography. A manufacturing process described below is repeatedly performed to sequentially form the first cladding 122a, the core 121 and the positioning core 14, and the second cladding 122b. A method of manufacturing the optical waveguide board 10 according to the first embodiment includes a first step of stacking the first cladding 122a of the optical waveguide 12 on the substrate 11 in the stacking direction perpendicular to the substrate 11. The method of manufacturing the optical waveguide board 10 includes a second step of stacking the core 121 of the optical waveguide 12 and the positioning core 14 on the first cladding 122a by using materials that are the same as each other. The method of manufacturing the optical waveguide board 10 includes a third step of stacking the second cladding 122b of the optical waveguide 12 so that the core 121 is interposed between the second cladding 122b and the first cladding 122a in the stacking direction.

In the method of manufacturing the optical waveguide board 10 according to the first embodiment, in the second step, the positioning core 14 is formed so as to protrude further than the core 121 toward the side opposite to the substrate 11 in the stacking direction. For example, in the second step, the core 121 and the positioning core 14 are formed by manufacturing processes that are the same as each other. For example, in a predetermined manufacturing process in the second step, the amount of exposure light with which the core 121 is irradiated and the amount of exposure light with which the positioning core 14 is irradiated differ from each other. For example, when a photoresist liquid used for photolithography is of a negative type, in the predetermined manufacturing process in the second step, the amount of exposure light with which the positioning core 14 is irradiated may be larger than the amount of exposure light with which the core 121 is irradiated. By adjusting the amount of exposure light irradiated in the predetermined manufacturing process between the positioning core 14 and the core 121, it is possible to form the positioning core 14 in such a way that the height of the positioning core 14 becomes larger than the height of the core 121. A method of forming the positioning core 14 and the core 121 is not limited to this. For example, in a predetermined manufacturing process in the second step, the positioning core 14 and the core 121 are each stacked on the first cladding 122a so that a heat amount based on heat applied to the positioning cores 14 and a heat amount based on heat applied to the core 121 differ from each other.

Figure 8:
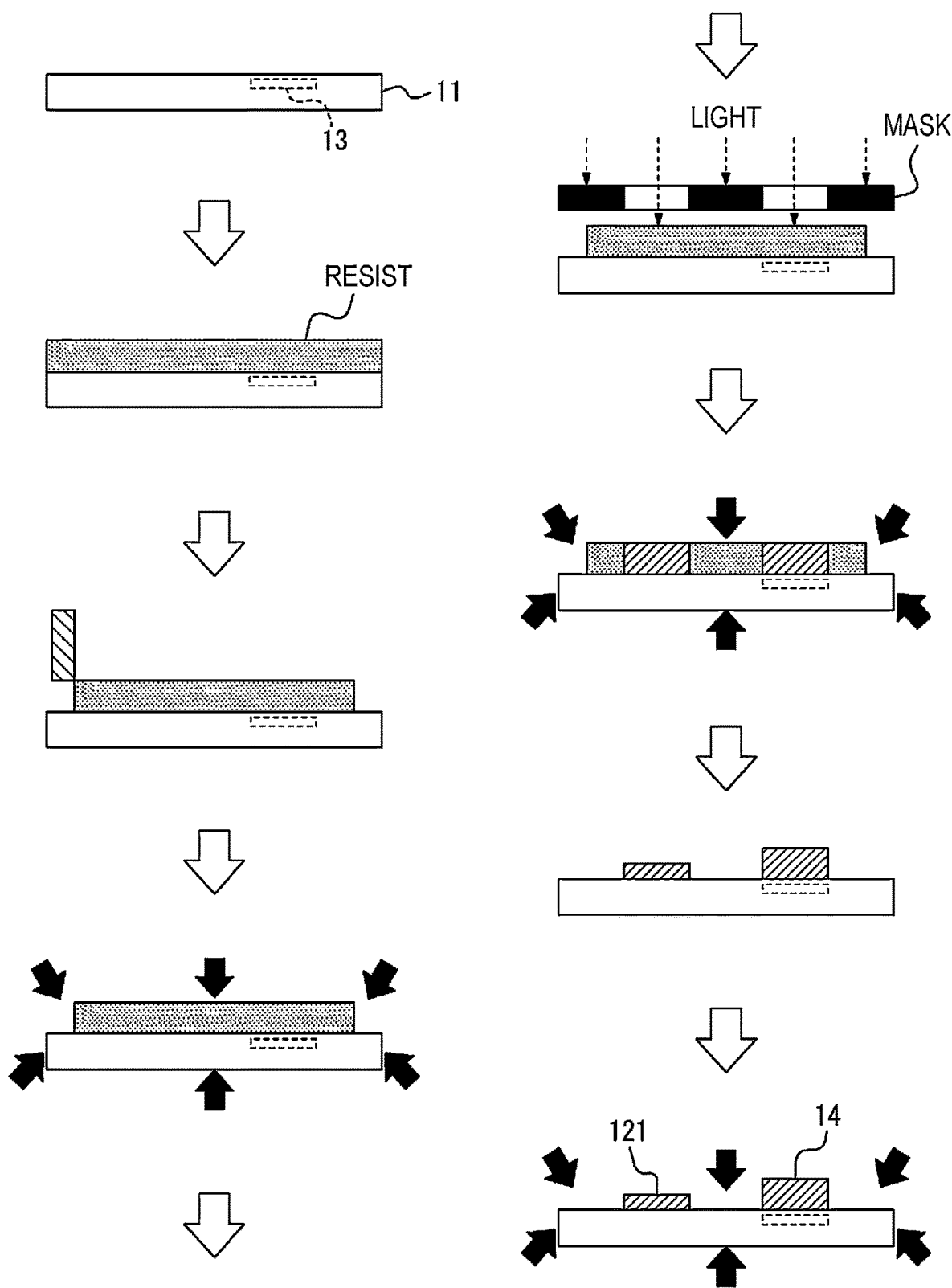
FIG. 8 is a schematic view illustrating an example of a method of manufacturing the optical waveguide board shown in FIG. 2.

FIG. 8 is a schematic view illustrating an example of the method of manufacturing the optical waveguide board 10 shown in FIG. 2. Hereafter, referring to FIG. 8, a method of forming the positioning core 14 of the optical connector module 1 according to the first embodiment will be described in further detail. For convenience of description, the first cladding 122a is omitted, and a case where the core 121 and the positioning core 14 are stacked on the substrate 11 will be described. A description similar to the following description also applies to forming of the cladding 122.

In a first process, pretreatment for cleaning the upper surface of the substrate 11 is performed.

In a second process, a photoresist liquid is ejected, and, for example, while the substrate 11 is rotated by a spin coater, the photoresist liquid is uniformly applied to the entire area of the upper surface of the substrate 11 due to a centrifugal force. Thus, a base for the core 121 of the optical waveguide 12 and the positioning core 14 is uniformly formed. A coating method used in the second process is not limited to spin coating, and may be any appropriate method. For example, the coating method may be bar coating, spray coating, or the like. When all manufacturing processes are finished, the heights of the core 121 and the positioning core 14 are smaller than or equal to the heights of corresponding parts of the photoresist liquid applied in the second process.

At the time when the second process is finished, the amount of photoresist liquid on the outer periphery of the upper surface of the substrate 11 is large. Accordingly, in a third process, edge rinsing is performed to wipe out the outer peripheral edge by using a needle. Thus, the thickness of the entirety of the photoresist liquid becomes uniform.

In a fourth process, pre-baking is performed to apply heat to the entirety at a temperature in the range of 90° C. to 120° C. Thus, the photoresist liquid becomes slightly solidified. At this time, due to the heat conductor 13 embedded in the substrate 11, a heat amount transferred to the positioning core 14 is smaller than a heat amount transferred to the core 121 of the optical waveguide 12. For example, due to the heat conductor 13, the temperature of the positioning core 14 becomes lower than the temperature of the core 121 of the optical waveguide 12. Because the temperature of the core 121 is higher than the temperature of the positioning core 14, organic solvents, such as a binder, in the core 121 evaporate easier than those in the positioning core 14. As a result, when all manufacturing processes are finished, the volume of the core 121 tends to become smaller than the volume of the positioning core 14. In the finished optical waveguide board 10, the positioning core 14 protrudes further than the core 121 of the optical waveguide 12 toward the side opposite to the substrate 11 in the stacking direction.

In a fifth process, a mask is placed on a part of the photoresist excluding parts that are to be left as the core 121 and the positioning core 14 in the finished optical waveguide board 10, and exposure is performed by irradiating the photoresist with ultraviolet radiation. Thus, only the parts of the photoresist irradiated with ultraviolet radiation are solidified. At this time, a photosensitizer mixed in the photoresist solidifies in accordance with the exposure light amount. The larger the exposure light amount and the larger the number of chemical bonds in the photosensitizer that are formed due to light, corresponding photoresist parts are left unremoved in a phenomenon described below. Accordingly, the exposure light amount of ultraviolet radiation with which the positioning core 14 is irradiated is made larger than the exposure light amount of ultraviolet radiation with which the core 121 of the optical waveguide 12 is irradiated. Thus, the positioning core 14 solidifies more solidly than the core 121 of the optical waveguide 12 and becomes more unlikely to be removed in development. As a result, in the finished optical waveguide board 10, the positioning core 14 protrudes further than the core 121 of the optical waveguide 12 toward the side opposite to the substrate 11 in the stacking direction. The method of adjusting the exposure light amount may be, for example, a method related to adjustment of light amount, such as a method of reducing the light amount of ultraviolet radiation by attaching an ultraviolet radiation filter only at a position directly in front to the core 121 of the optical waveguide 12. The method of adjusting the exposure light amount may be, for example, a method related to adjustment of exposure time, such as a method of making the exposure time for which the positioning core 14 is irradiated with ultraviolet radiation longer.

In a sixth process, post-exposure baking (PEB) of applying heat to the entirety at a temperature in the range of 50° C. to 90° C. may be performed. In this case, the irregularity of a side surface of a photoresist part irradiated with ultraviolet radiation in the fifth process is smoothed. PEB in the sixth process may be omitted, if not necessary.

In a seventh process, by using a developing liquid, development is performed to remove the part of photoresist excluding the parts to be left as the core 121 and the positioning core 14 in the finished optical waveguide board 10. Due to the development, adjustment between the positioning core 14 and the core 121, which is represented by the fifth process described above, is reflected, and the height of the core 121 becomes smaller than the height of the positioning core 14.

In an eighth process, post-baking it performed to apply heat to the entirety in a drying oven. Thus, the parts of photoresist to be left as the core 121 and the positioning core 14 become harder and strongly adhere to the substrate 11.

With the optical connector module 1 and the method of manufacturing the optical waveguide board 10 according to the first embodiment described above, the accuracy in positioning the optical connector 20 relative to the optical waveguide board 10 is improved. To be more specific, because the positioning core 14 of the optical waveguide board 10 protrudes further than the core 121 toward the side opposite to the substrate 11, the protruding amount of the positioning core 14 becomes larger. Thus, engagement of the positioning core 14 with the positioning target portion 23 of the optical connector 20 becomes more reliable. For example, if the waveguide mode of the optical waveguide 12 is a single mode, the up-down width of the core 121 is smaller than or equal to about 10 μm, which is very small. In such a case, if, as in the existing technology, the positioning core 14 is formed through the same manufacturing process to have the same up-down width as the core 121, the positioning core 14 and the positioning target portion 23 do not engage with each other, and the position of the optical connector 20 may become displaced. As the protruding amount of the positioning core 14 becomes larger, the sensitivity in positioning the optical connector 20 relative to the optical waveguide board 10 is improved, and such displacement is suppressed. Because forming of the positioning core 14 and the core 121 completes in the same manufacturing process, increase in cost is also suppressed.

Because the positioning core 14 is stacked on the first cladding 122a, the positioning core 14 can be stacked on the stacking surface the first cladding 122a, which is smoother than the stacking surface of the substrate 11. Thus, the positioning core 14 is formed with higher accuracy.

Because the amount of exposure light with which the core 121 of the optical waveguide 12 is irradiated and the amount of exposure light with which the positioning core 14 is irradiated differ from each other, it is possible to adjust the degree of solidification of the photosensitizer mixed in the photoresist to differ between the core 121 and the positioning core 14. For example, when the amount of exposure light with which the positioning core 14 is irradiated is larger than the amount of exposure light with which the core 121 is irradiated, it is possible to make the positioning core 14 solidify more firmly than the core 121 to enable the positioning core 14 to be more unlikely to be removed in development.

Because the distance between the positioning core 14 and the heat conductor 13 is smaller than the distance between the core 121 and the heat conductor 13, the temperature of the positioning core 14 is lower than the temperature of the core 121 when heat is applied to the entirety in the process of manufacturing the optical waveguide board 10. Accordingly, the vaporization amount of organic solvent is smaller for the positioning core 14, and, as a result, it is possible to form the positioning core 14 so as to protrude upward further than the core 121.

The accommodation portion 24 of the optical connector 20 is formed outside the positioning target portion 23 along the substrate 11. Thus, for example, even in a case where, after positioning the optical connector 20 on the optical waveguide board 10, an adhesive is applied to the left and right side surfaces the optical connector 20 to fix the optical connector 20 to the optical waveguide board 10, it is possible to prevent the adhesive from flowing into the positioning target portion 23.

For example, due to a capillary action, the adhesive flows from the outside to the inside through the space S between the optical connector 20 and the substrate 11. If the accommodation portion 24 is not formed in the lower surface 21a of the optical connector 20, the adhesive may flow into the positioning target portion 23 due to a capillary action. If the adhesive flows into the positioning target portion 23, the positioning target portion 23 and the positioning core 14 may not become engaged appropriately, and the optical connector 20 may become displaced relative to the optical waveguide board 10.

The accommodation portion 24 can accommodate an adhesive that flows from the outside to the inside and can suppress the adhesive from reaching the positioning target portion 23, which is formed further inside. Accordingly, the accommodation portion 24 can suppress the aforementioned displacement of the optical connector 20 due to the adhesive.

Because the accommodation portion 24 is formed in the lower surface 21a facing the substrate 11 in the optical connector 20 and the accommodation portion 24 extends in the front-back direction, flow of the adhesive to the inside is suppressed over the front-back width where the accommodation portion 24 is formed. Accordingly, the accommodation portion 24 can more effectively suppress the aforementioned displacement of the optical connector 20 due to the adhesive.

The accommodation portion 24 not only can suppress the aforementioned flow of the adhesive to the inside of the optical connector 20, but also can suppress spreading of the adhesive to the outside of the optical connector 20. Thus, for example, even if a plurality of optical waveguides 12 are formed in the optical waveguide board 10 with small distances therebetween, when fixing the optical connector 20 to each optical waveguide 12 by using an adhesive, it is possible to reduce the risk that parts of the adhesive applied to adjacent optical connectors 20 interfere with each other.

Figure 9A:
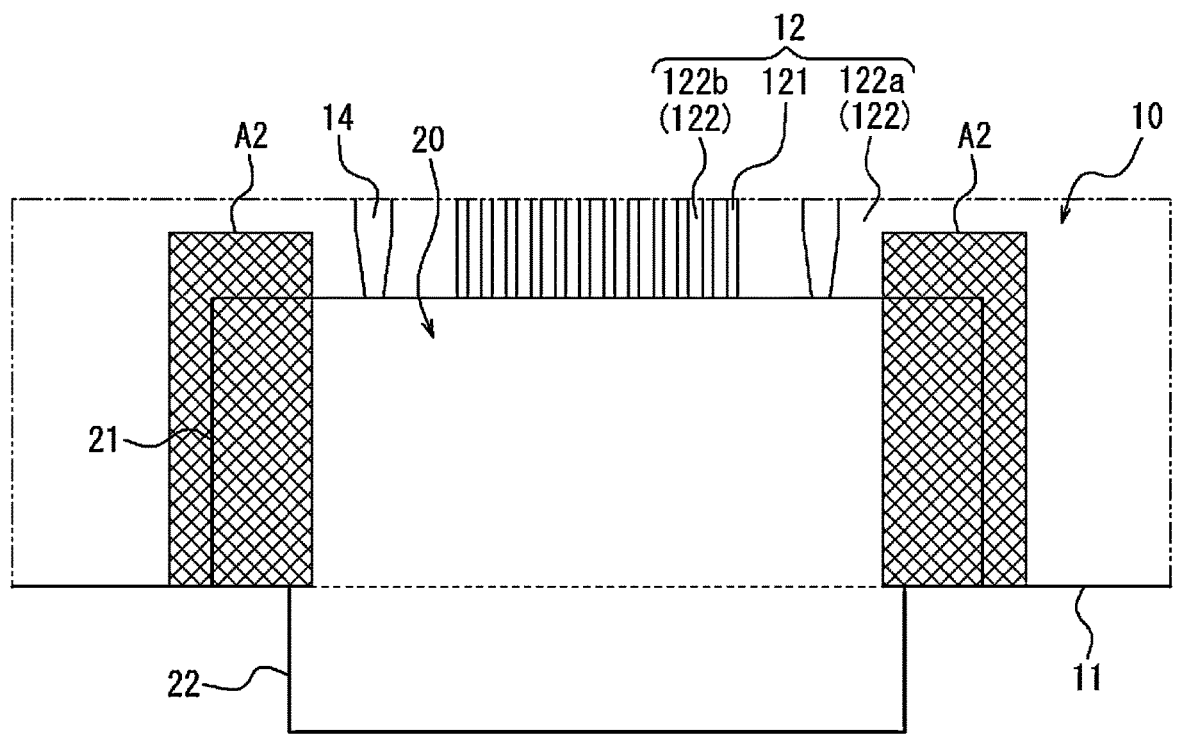
FIG. 9A is a schematic top view illustrating a first modification of the optical waveguide board shown in FIG. 2.

FIG. 9A is a schematic top view illustrating a first modification of the optical waveguide board 10 shown in FIG. 2. In the first embodiment, the first cladding 122a has a width that is smaller than the distance between the pair of left and right accommodation portions 24 of the optical connector 20. However, the configuration of the optical connector module 1 is not limited to this. The optical connector module 1 may have any appropriate configuration in which spaces S are formed below the left and right end portions of the lower surface 21a including the accommodation portions 24 of the optical connector 20.

For example, as illustrated in FIG. 9A, the first cladding 122a may be stacked on the entirety of the substrate 11, and the spaces S may be formed by removing the first cladding 122a at positions respectively near the left and right end portions of the lower surface 21a including the accommodation portions 24 of the optical connector 20. In FIG. 9A, regions A2 from which the first cladding 122a is removed each have, for example, a rectangular shape, and each have a width that is wider in the front-back direction than the front-back width of the first base member 21 of the optical connector 20.

Figure 9B:
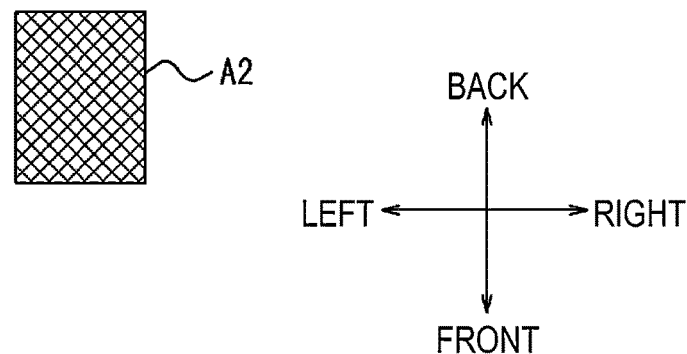
FIG. 9B is a schematic top view illustrating a second modification of the optical waveguide board shown in FIG. 2.

FIG. 9B is a schematic top view illustrating a second modification of the optical waveguide board 10 shown in FIG. 2. In FIG. 9B, only the shape of the region A2 on the right side of FIG. 9A is illustrated. In FIG. 9B, the shape of the region A2 is, for example, a rectangular shape, and the width of the region A2 in the front-back direction is smaller than the front-back width of the first base member 21 of the optical connector 20.

Figure 9C:
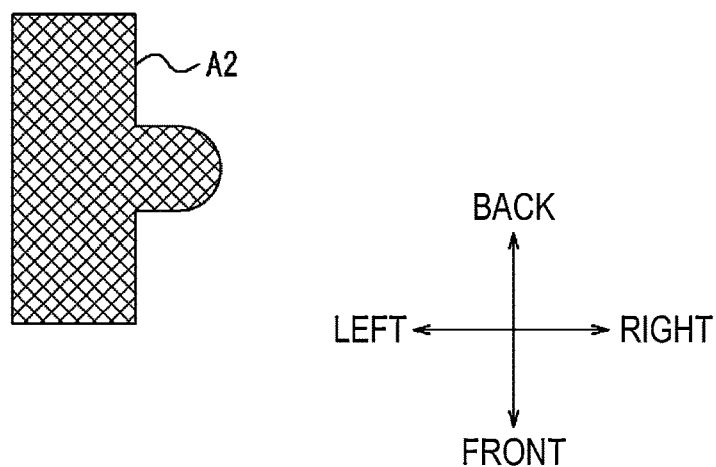
FIG. 9C is a schematic top view illustrating a third modification of the optical waveguide board shown in FIG. 2.

FIG. 9C is a schematic top view illustrating a third modification of the optical waveguide board 10 shown in FIG. 2. In FIG. 9C, only the shape of the region A2 on the right side of FIG. 9A is illustrated. In FIG. 9C, the shape of the region A2 is, for example, a convex shape having a tip with a rounded edge. The width of the region A2 in the front-back direction may be larger than the front-back width of the first base member 21 of the optical connector 20, or may be smaller than the front-back width of the first base member 21.

Figure 9D:
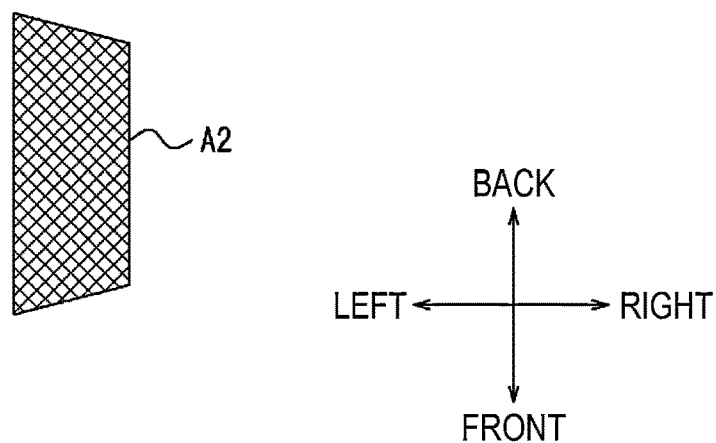
FIG. 9D is a schematic top view illustrating a fourth modification of the optical waveguide board shown in FIG. 2.

FIG. 9D is a schematic top view illustrating a fourth modification of the optical waveguide board 10 shown in FIG. 2. In FIG. 9D, only the shape of the region A2 on the right side of FIG. 9A is illustrated. In FIG. 9D, the shape of the region A2 is, for example, a trapezoidal shape having a front-back width that increases from the outside toward the inside. The width of the region A2 in the front-back direction may be larger than the front-back width of the first base member 21 of the optical connector 20, or may be smaller than the front-back width of the first base member 21.

Figure 9E:
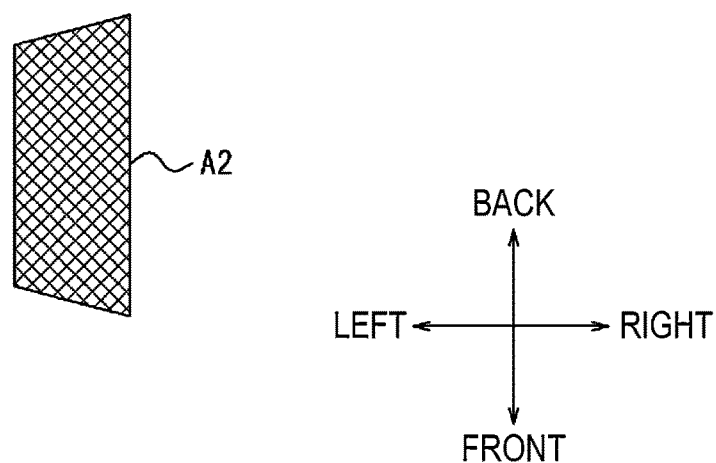
FIG. 9E is a schematic top view illustrating a fifth modification of the optical waveguide board shown in FIG. 2.

FIG. 9E is a schematic top view illustrating a fifth modification of the optical waveguide board 10 shown in FIG. 2. In FIG. 9E, only the shape of the region A2 on the right side of FIG. 9A is illustrated. In FIG. 9E, the shape of the region A2 is, for example, a trapezoidal shape having a front-back width that decreases from the outside toward the inside. The width of the region A2 in the front-back direction may be larger than the front-back width of the first base member 21 of the optical connector 20, or may be smaller than the front-back width of the first base member 21.

Figure 10A:
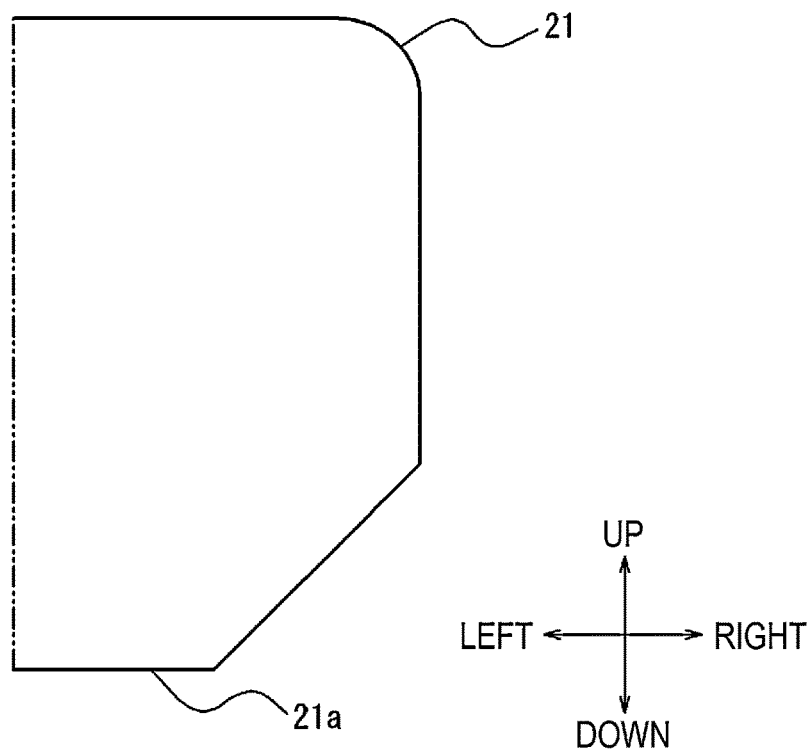
FIG. 10A is a schematic front view illustrating a first modification of an optical connector shown in FIG. 6.

FIG. 10A is a schematic front view illustrating a first modification of the optical connector 20 shown in FIG. 6. FIG. 10A illustrates the shape of the right-side surface of the first base member 21. In FIG. 10A, the left and right side surfaces of the first base member 21 of the optical connector 20 each include an inclined surface that is inclined inward and downward from a substantially central part thereof in the up-down direction.

Figure 10B:
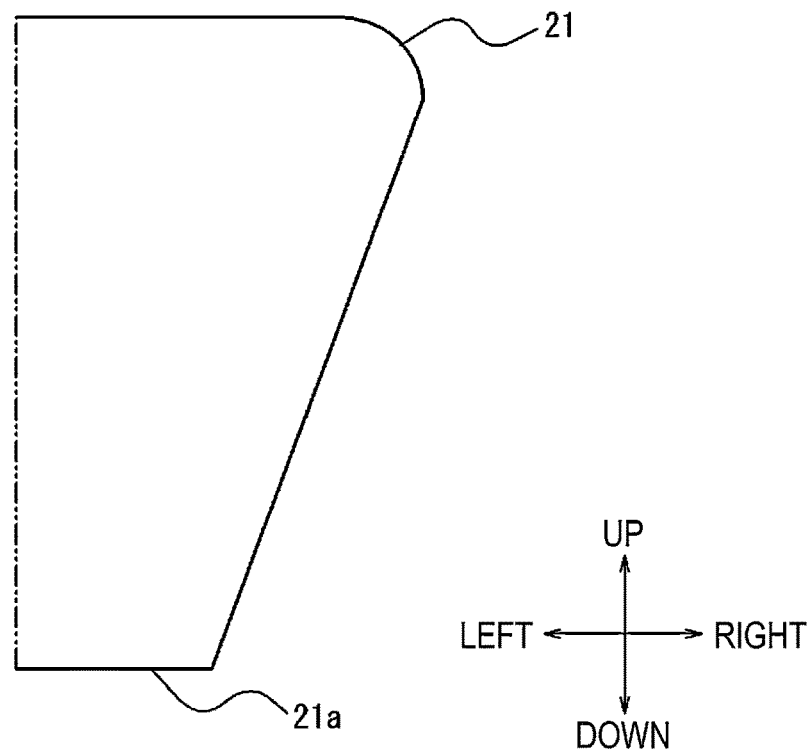
FIG. 10B is a schematic front view illustrating a second modification of the optical connector shown in FIG. 6.

FIG. 10B is a schematic front view illustrating a second modification of the optical connector 20 shown in FIG. 6. FIG. 10B illustrates the shape of the right side surface of the first base member 21. In FIG. 10B, the left and right side surfaces of the first base member 21 of the optical connector 20 each include an inclined surface that is inclined inward and downward from an upper part thereof.

Figure 11A:
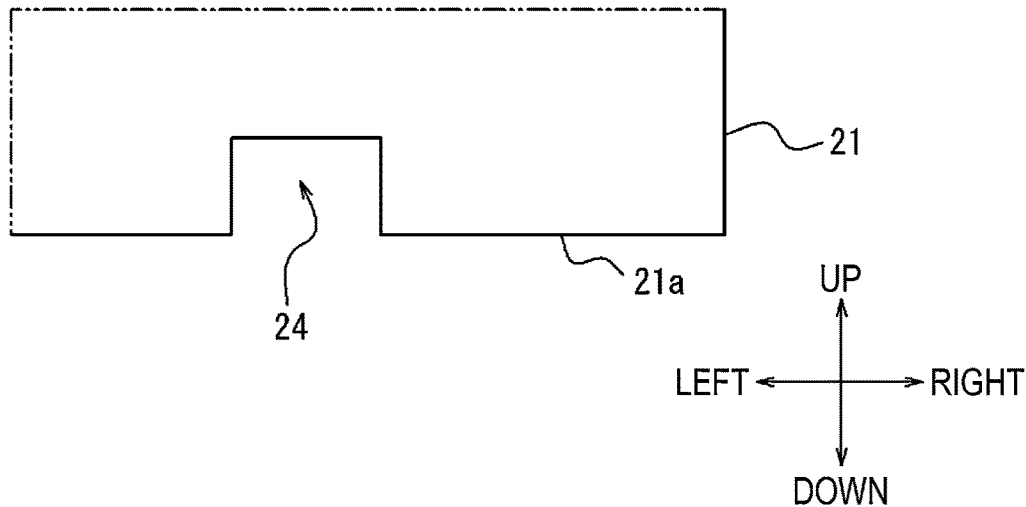
FIG. 11A is a schematic front view illustrating a third modification of the optical connector shown in FIG. 6.

FIG. 11A is a schematic front view illustrating a third modification of the optical connector 20 shown in FIG. 6. FIG. 11A illustrates the shape of a part near the right end of the lower surface 21a, including the accommodation portion 24. In FIG. 11A, the accommodation portion 24 has a rectangular shape in a sectional view.

Figure 11B:
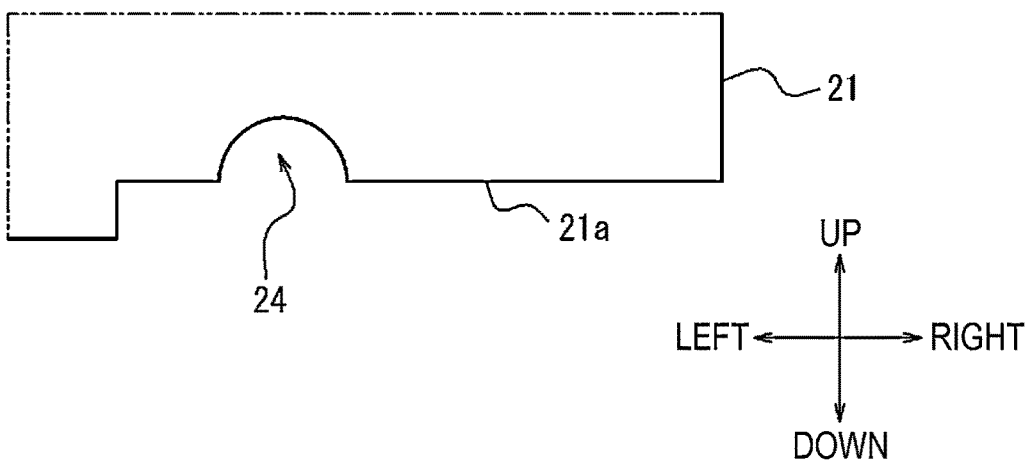
FIG. 11B is a schematic front view illustrating a fourth modification of the optical connector shown in FIG. 6.

FIG. 11B is a schematic front view illustrating a fourth modification of the optical connector 20 shown in FIG. 6. FIG. 11B illustrates the shape of a part the right end of the lower surface 21a, including the accommodation portion 24. In FIG. 11B, the lower surface 21a protrudes further downward at a position inside the accommodation portion 24. In this case, the accommodation portion 24 may face, instead of the upper surface of the substrate 11, the upper surface of the first cladding 122a. A space S may be formed between a corresponding part of the lower surface 21a and the first cladding 122a.

Figure 11C:
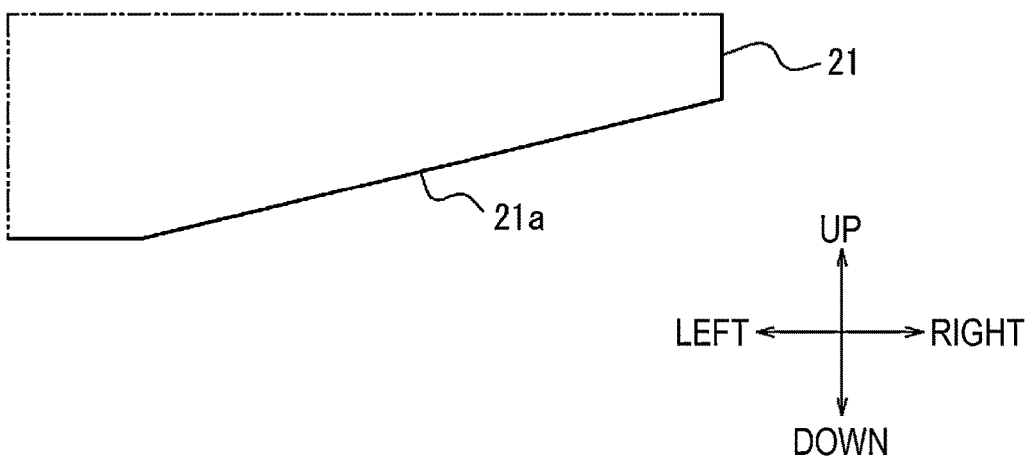
FIG. 11C is a schematic front view illustrating a fifth modification of the optical connector shown in FIG. 6.

FIG. 11C is a schematic front view illustrating a fifth modification of the optical connector 20 shown in FIG. 6. FIG. 11C illustrates the shape of a part near the right end of the lower surface 21a. In FIG. 11C, the optical connector 20 does not have the accommodation portion 24, and the lower surface 21a of the optical connector 20 includes an inclined surface that is inclined inward and downward.

In the first embodiment, it has been described that the accommodation portion 24 continuously extends from the front end to the back end of the first base member 21. However, the configuration of the accommodation portion 24 is not limited to this. The accommodation portion 24 may be formed, as one or more concave portions that extend by a predetermined length within the front-back width of the first base member 21, at any appropriately position outside the positioning target portion 23.

In the first embodiment, it has been described that the accommodation portion 24 is a recessed portion. However, the configuration of the accommodation portion 24 is not limited to this. The accommodation portion 24 may have any appropriate configuration that enables the accommodation portion 24 to accommodate the adhesive applied to the optical connector 20. For example, the accommodation portion 24 may be formed as a through-hole.

In the first embodiment, it has been described that the positioning target portion 23 is a recessed portion. However, the configuration of the positioning target portion 23 is not limited to this. The positioning target portion 23 may have any appropriate configuration that enables the positioning target portion 23 to be engaged with the positioning core 14. For example, the positioning target portion 23 may be formed as a through-hole.

In the first embodiment, it has been described that the core 121 of the optical waveguide 12 and the positioning core 14 are formed by manufacturing processes that are the same as each other. However, the manufacturing processes are not limited to these. The core 121 of the optical waveguide 12 and the positioning core 14 may be formed by different manufacturing processes. For example, in the light exposure in the fifth process described above, first, only the positioning core 14 may be irradiated with ultraviolet radiation by using a mask for the positioning core 14, and then only the core 121 may be irradiated with ultraviolet radiation by using a mask for the core 121.

In this case, if the photosensitizer solidifies slowly over time, by first irradiating the positioning core 14 with ultraviolet radiation, the solidification time of the positioning core 14 becomes longer than that of the core 121. Accordingly, the positioning core 14 solidifies more firmly than the core 121, and the positioning core 14 becomes less likely to be removed during development. In this way, adjustment of the heights of the positioning core 14 and the core 121 may be performed based on the difference in solidification time.

In the first embodiment, it has been described that the photoresist liquid used for photolithography is of a negative type. However, the photoresist liquid it not limited to this. The photoresist liquid may be of a positive type. In this case, for example, by irradiating only the core 121 of the optical waveguide 12 with a small amount of ultraviolet radiation while maintaining the amount of exposure light with which the positioning core 14 is irradiated to be zero, the height of the core 121 after development may be reduced.

In the first embodiment, it has been described that the heat conductor 13 is embedded in the substrate 11 along the positioning core 14. However, the position of the heat conductor 13 is not limited to this. The heat conductor 13 may be disposed on the lower surface of the substrate 11, which is on the side opposite to the upper surface on which the positioning core 14 is formed, at a position facing the positioning core 14. In this case, heat near the positioning core 14 is discharged to the outside the substrate 11 through the heat conductor 13, and the temperature of the positioning core 14 decreases more effectively than the temperature of the core 121.

In the first embodiment, it has been described that, by improving the heat dissipation effect near the positioning core 14 by using the heat conductor 13, the temperature of the positioning core 14 decreases to a level below the temperature of the core 121. However, the configuration of the optical connector module 1 is not limited to this. Instead of or in addition to the configuration such that the heat conductor 13 is embedded in the substrate 11 along the positioning core 14, the optical connector module 1 may have a configuration such that a heat insulator, which does not easily conduct heat, is embedded in the substrate 11 along the core 121 of the optical waveguide 12.

In the first embodiment, it has been described that the cladding 122 includes the first cladding 122a and the second cladding 122b. However, the configuration of the cladding 122 is not limited to this. The cladding 122 need not have the second cladding 122b, if, by using an air layer instead of the second cladding 122b, it is possible to form a predetermined waveguide mode with the core 121 and the first cladding 122a of the optical waveguide 12 and to sufficiently realize the function of the optical waveguide 12.

Second Embodiment

Figure 12:
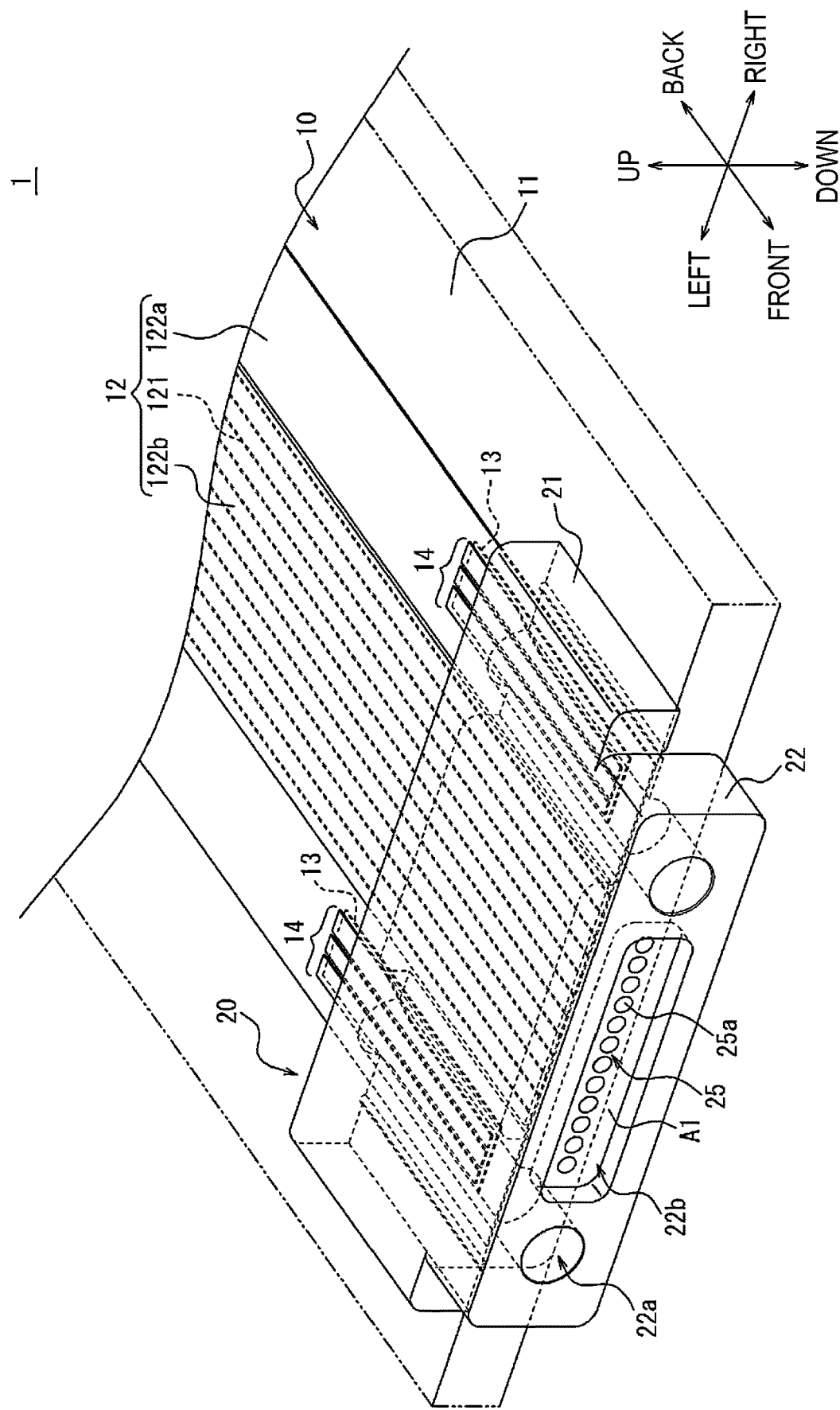
FIG. 12 is a perspective view of an optical connector module according to a second embodiment.
Figure 13:
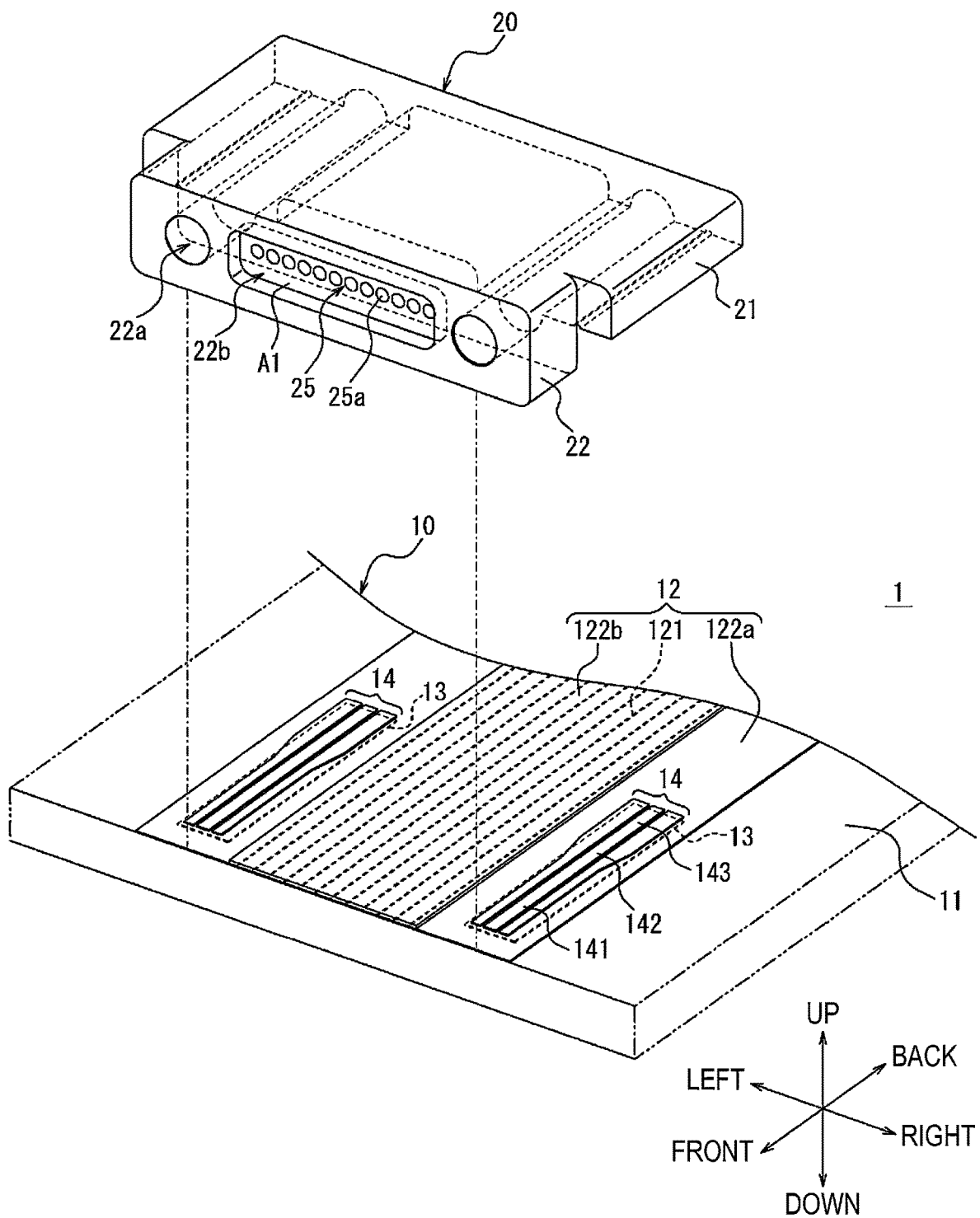
FIG. 13 is an exploded perspective view of the optical connector module shown in FIG. 12.
Figure 14:
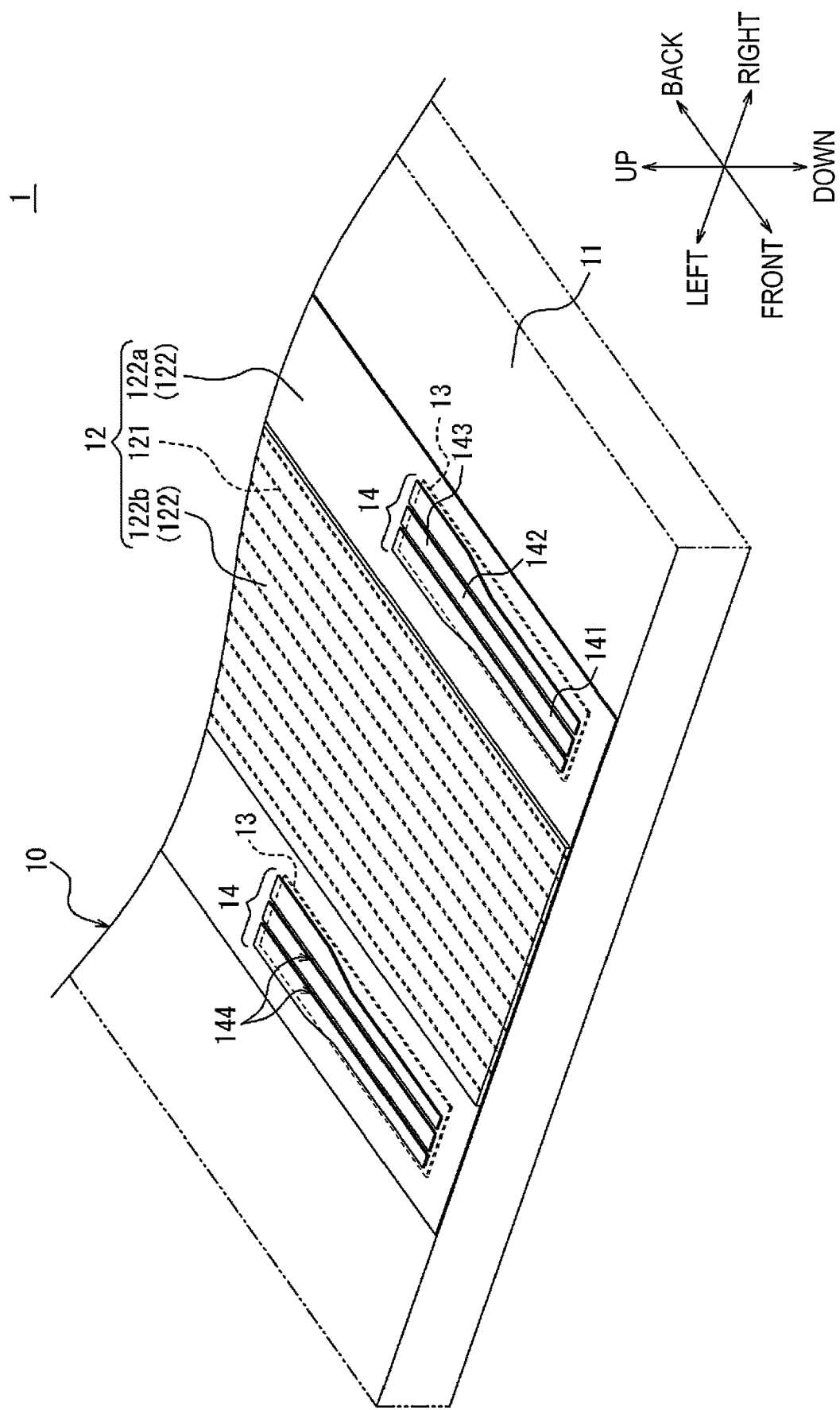
FIG. 14 is a perspective view of only an optical waveguide board shown in FIG. 13.

Referring to FIGS. 12 to 18C, a second embodiment of the present disclosure will be mainly described. FIG. 12 is a perspective view of an optical connector module 1 according to the second embodiment. FIG. 13 is an exploded perspective view of the optical connector module 1 shown in FIG. 12. FIG. 14 is a perspective view illustrating only an optical waveguide board 10 shown in FIG. 13. FIG. 15 is a front view of the optical connector module 1 shown in FIG. 12.

FIG. 16 is an enlarged view of a region surrounded by an alternate long and short dash line in FIG. 15. FIG. 17 is an enlarged front sectional view schematically illustrating a part of the optical connector module 1 shown in FIG. 12.

FIGS. 12 to 17 respectively correspond to FIGS. 1 to 3 and 5 to 7 in the first embodiment. The optical connector module 1 according to the second embodiment differs from that of the first embodiment in the shape of the positioning core 14. Other configurations, functions, effects, modifications, and the like are similar to those of the first embodiment, and the corresponding descriptions apply also to the optical connector module 1 according to the second embodiment. In the following, constituent elements that are similar to those of the first embodiment will be denoted by the same numerals and descriptions of such constituent elements will be omitted. Differences from the first embodiment will be mainly described.

In the second embodiment, the upper surface of the positioning core 14 of the optical waveguide board 10 may be at the same up-down position as the core 121 of the optical waveguide 12, or may be at a different up-down position. For example, as in the first embodiment, the upper surface of the positioning core 14 may be positioned above the upper surface of the core 121. Referring to FIG. 14, the positioning core 14 of the optical connector module 1 according to the second embodiment includes cutout portions 144 that are linearly cut out at two positions over the entire length the front-back direction. For example, the pair of cutout portions 144 are formed at positions that are line-symmetrical about the center line of the positioning core 14 in the left-right direction.

Referring to FIGS. 15 and 16, the through-hole 22a of the optical connector 20 faces the positioning core 14 in the extension direction of the core 121 perpendicular to the stacking direction and enables an end surface of the positioning core 14 to be observed in the extension direction of the core 121. Referring to FIG. 17, the positioning core 14 has four reference surfaces A3, A4, A5, and A6 that appear due to the pair of cutout portions 144. The reference surfaces A3, A4, A5, and A6 are formed as inner surfaces of the positioning core 14 in the left-right direction, which are different from outer surfaces of the positioning core 14 in the left-right direction.

For example, when the positioning core 14 is observed through the through-hole 22a in the extension direction of the core 121, a pair of reference surfaces A3 and A6 are separated from each other in a state in which the positioning core 14 is not interposed in a direction perpendicular to the stacking direction and extend in the stacking direction. The pair of reference surfaces A3 and A6 face each other in a direction that is perpendicular to the extension direction of the core 121 and to the stacking direction. Two cutout portions 144 are formed between the pair of reference surfaces A3 and A6. Likewise, when the positioning core 14 is observed through the through-hole 22a in the extension direction of the core 121, a pair of reference surfaces A4 and A5 are separated from each other in the direction perpendicular to the stacking direction and extend in the stacking direction. One of the two cutout portions 144 is formed between the pair of reference surfaces A3 and A4, and the other cutout portion 144 is formed between the pair of reference surfaces A5 and A6.

When the positioning core 14 is observed through the through-hole 22a in the extension direction of the core 121, each pair of reference surfaces are formed at positions that are line-symmetrical to each other with respect to the center line of the through-hole 22a parallel to the stacking direction. Each pair of reference surfaces extend from the stacking surface of the first cladding 122a on which the positioning core 14 is stacked. To be more specific, the cutout portion 144 is cut out to the upper surface of the first cladding 122a over the entire up-down width of the positioning core 14, and the lower ends of each pair of reference surfaces and the upper surface of the first cladding 122a are disposed at the same up-down position.

With the optical connector module 1 according to the second embodiment described above, the accuracy in positioning the optical connector 20 relative to the optical waveguide board 10 is improved. For example, with the positioning core 14 in the first embodiment, which does not have the cutout portion 144 and in which each reference surface is not formed, when the positioning core 14 is attempted to be observed from the front side by using a measuring device or the like, the image of the positioning core 14 may be out of focus because the up-down width of the positioning core 14 is too small relative to the diameter of the through-hole 22a. With the optical connector module 1 according to the second embodiment, because the pair of reference surfaces are formed, it is possible to accurately measure the distance between the pair of reference surfaces when the positioning core 14 is observed through the through-hole 22a in the extension direction of the core 121.

By defining the distance between the pair of reference surfaces, it is possible to grasp the relationship between the position of the through-hole 22a and the position of the positioning core 14 in a front view. Thus, it is possible to easily measure the displacement between the through-hole 22a and the positioning core 14 in each direction and in each rotation direction. It is possible to easily measure the displacement between the optical connector 20 and the optical waveguide board 10. To be more specific, if the pair of reference surfaces are displaced parallelly in the left-right direction in the through-hole 22a in a front view, it is possible for a measuring device, an operator, and the like to recognize that the optical connector 20 and the optical waveguide board 10 are displaced in the left-right direction. If the pair of reference surfaces are displaced parallelly the up-down direction in the through-hole 22a in a front view, it is possible for a measuring device, an operator, and the like to recognize that the optical connector 20 and the optical waveguide board 10 are displaced in the up-down direction. If the pair of reference surfaces are out of focus in a front view, it is possible for a measuring device, an operator, and the like to recognize that the optical connector 20 and the optical waveguide board 10 are displaced in the front-back direction. If the observed shape of the positioning core 14 changes from the shape when the optical connector 20 and the optical waveguide board 10 are accurately positioned or if the observed shape of the positioning core 14 differs between the left and right through-holes 22a in a front view, it is possible for a measuring device, an operator, and the like to recognize that the optical connector 20 is displaced relative to the optical waveguide board 10 due to rotation around at least one of the axes extending in the front-back direction, the left-right direction, and the up-down direction.

Because it is easy to measure the displacement between the optical connector 20 and the optical waveguide board 10, it is easy to position the optical connector 20 relative to the optical waveguide board 10. In addition, the accuracy in positioning is improved. For example, with existing technology, after roughly positioning an optical connector and an optical waveguide board and connecting another optical transmission line to the optical connector, light is caused to propagate through the optical waveguide board and the optical transmission line, and, while monitoring the intensity of output light, the positioning of the optical connector and the optical waveguide board relative to each other is performed so that the optical coupling loss becomes the minimum. In such a case, it takes a very long time to perform the positioning operation. With the optical connector module 1 according to the second embodiment, it is possible to position the optical connector 20 relative to the optical waveguide board 10 without causing light to propagate. In addition, for example, it is possible to directly position the optical connector 20 relative to the optical waveguide board 10 while observing images of the positioning core 14 and the through-hole 22a.

Because the pair of reference surfaces are formed at positions that are line-symmetrical to each other about the center line L of the through-hole 22a, it is possible to grasp the relationship between the position of the center line L of the through-hole 22a and the position of the pair of reference surfaces by comparing these positions. Thus, it is possible to easily measure the displacement between the through-hole 22a and the positioning core 14 in each direction and in each rotational direction. It is possible to easily measure the displacement between the optical connector 20 and the optical waveguide board 10.

Because the pair of reference surfaces extend from the stacking surface of the first cladding 122a, the up-down width of each reference surface is large, and the visibility of each reference surface is improved. Thus, it is possible to more accurately measure the displacement between the optical connector 20 and the optical waveguide board 10.

Because each reference surface is formed as an inner surface of the positioning core 14 in the left-right direction, which differs from the outer surfaces of the positioning core 14 in the left-right direction, even when the positioning target portion 23 of the optical connector 20 engages with the positioning core 14, the positioning target portion 23 and each reference surface do not contact each other. Accordingly, each reference surface is not damaged by the positioning target portions 23, and the smoothness of each reference surface is maintained. Thus, the visibility of each reference surface is maintained, and the accuracy in positioning the optical connector 20 relative to the optical waveguide board 10 is maintained.

In the second embodiment, it has been described that the pair of reference surfaces are formed at positions that are line-symmetrical to each other with respect to the center line L of the through-hole 22a. However, the positions of the pair of reference surfaces are not limited to these. The pair of reference surfaces need not be line-symmetrical to each other with respect to the center line L of the through-hole 22a.

In the second embodiment, it has been described that the four reference surfaces A3, A4, A5, and A6 are formed. However, the number of reference surfaces is not limited to this. The positioning core 14 may have any appropriate number of reference surfaces, as long as the positioning core 14 has at least a pair of reference surfaces that are separated from each other in a state in which the positioning core 14 is not interposed therebetween in the left-right direction.

In the second embodiment, it has been described that the pair of reference surfaces extend from the stacking surface of the first cladding 122a on which the positioning core 14 is stacked. However, the pair of reference surfaces are not limited to these. For example, the cutout portion 144 may be cut out in a part of the positioning core 14 in the up-down direction to a central part of the positioning core 14, and the pair of reference surfaces may be formed with an up-down width corresponding to the part in the up-down direction.

For example, in FIG. 17, the sectional shapes of protruding portions of the positioning core 14 formed by the cutout portions 144 are all rectangular. However, the sectional shapes are not limited to these. The sectional shapes of the protruding portions may be any appropriate shape. For example, the sectional shapes of each protruding portion may be semicircular. The sectional shapes of the protruding portion may be the same as each other or may be different from each other.

For example, in FIG. 17, the protruding portions of the positioning core 14 formed by the cutout portions 144 all have the same height. However, the protruding portions are not limited to these. The protruding portions may have heights that differ from each other.

Figure 18A:
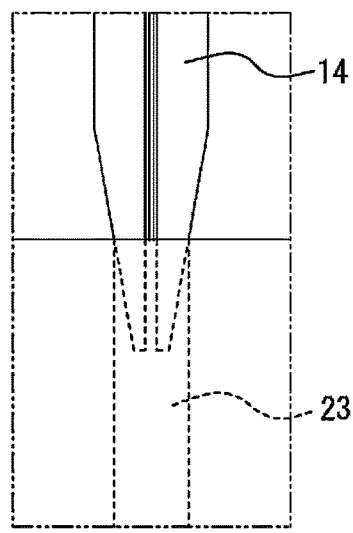
FIG. 18A is a schematic top view of a first modification of a positioning core of the optical waveguide board shown in FIG. 13.

FIG. 18A is a schematic top view of a first modification of the positioning core 14 of the optical waveguide board 10 shown in FIG. 13. For example, the positioning core 14 may have a shape shown in FIG. 18A. For example, in the positioning core 14, the front end surface of a protruding portion at the center may be located behind the front end surfaces of protruding portions on the left and right sides. The protruding portion at the center may extend continuously backward in parallel with the protruding portions on the left and right sides.

Figure 18B:
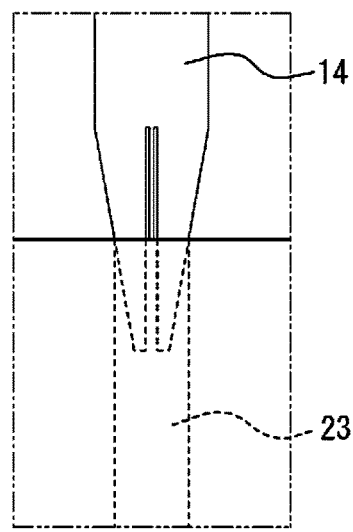
FIG. 18B is a schematic top view of a second modification of the positioning core of the optical waveguide board shown in FIG. 13.

FIG. 18B is a schematic top view illustrating a second modification of the positioning core 14 of the optical waveguide board 10 shown in FIG. 13. For example, the positioning core 14 may have a shape shown in FIG. 18B. For example, in the positioning core 14, the front end surface of a protruding portion at the center may be located behind the front end surfaces of protruding portions on the left and right sides. The protruding portion at the center may extend by a predetermined length in the front-back direction in the positioning core 14.

Figure 18C:
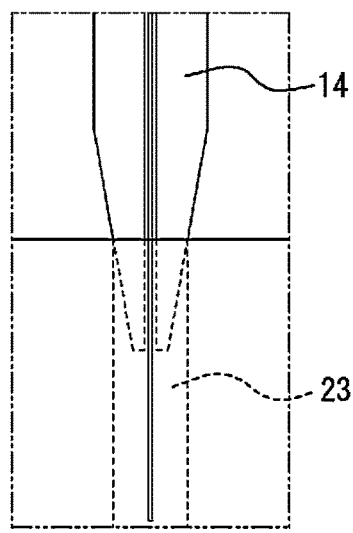
FIG. 18C is a schematic top view of a third modification of the positioning core of the optical waveguide board shown in FIG. 13.

FIG. 18C is a schematic top view illustrating a third modification of the positioning core 14 of the optical waveguide board 10 shown in FIG. 13. For example, the positioning core 14 may have a shape shown in FIG. 18C. For example, in the positioning core 14, the front end surface of a protruding portion at the center may be located in front of the front end surfaces of protruding portions on the left and right sides.

It should be clear for a person having ordinary skill in the art that the present disclosure can be carried out in predetermined embodiments other than the embodiments described above without departing from the spirit and essential features thereof. Accordingly, the foregoing descriptions are exemplary, and the present disclosure is not limited to these. The scope of the disclosure is defined not by the foregoing descriptions but by the claims. Some of all modifications that are within the range of the equivalents thereof are included therein.

For example, the shape, the arrangement, the orientation, the number, and the like of each constituent element described above are not limited to those in the forgoing descriptions and the drawings. The shape, the arrangement, the orientation, the number, and the like of each constituent element may be set in any appropriate manner, as long as the function thereof can be realized.

For example, functions and the like included in each step and each manufacturing process in the method of manufacturing the optical waveguide board described above may be rearranged while avoiding physical contradiction, and a plurality of steps or a plurality of manufacturing processes may be combined or may be divided.

REFERENCE SIGNS LIST 1 optical connector module
10 optical waveguide board
11 substrate
12 optical waveguide
121 core
122 cladding
122a first cladding
122b second cladding
13 heat conductor
14 positioning core
141 small-width portion
142 engagement portion
143 large-width portion
144 cutout portion
20 optical connector
21 first base member
21a lower surface
21b recessed portion
22 second base member
22a through-hole
22b recessed portion
23 positioning target portion
24 accommodation portion
25 lens portion
25a lens
A1 front surface
A2 region
A3, A4, A5, A6 reference surface
L center line
S space

The invention claimed is:

1. An optical connector module comprising: an optical waveguide board; and
   an optical connector attached to the optical waveguide board, wherein the optical connector includes
   a positioning target portion attached to the optical waveguide board, and
   the optical connector is positioned relative to the optical waveguide board in a state in which the positioning target portion is attached to the optical waveguide board,
   wherein the optical waveguide board includes
   an optical waveguide including a first cladding and a core stacked on the first cladding, the first cladding being stacked on a substrate in a stacking direction perpendicular to the substrate, and
   a positioning core that is stacked on the first cladding by using a material the same as a material of the core and that is accommodated in the positioning target portion,
      wherein the optical connector includes a through-hole that faces the positioning core in an extension direction of the core perpendicular to the stacking direction and that enables an end surface of the positioning core to be observed therethrough in the extension direction,
      wherein the positioning core includes a pair of reference surfaces extending in the stacking direction, and
   wherein, when the positioning core is observed through the through-hole in the extension direction, the pair of reference surfaces face each other with a cutout portion provided between the pair of reference surfaces in a direction perpendicular to the extension direction and the stacking direction.

2. The optical connector module according to claim 1, wherein the positioning core protrudes further than the core toward a side opposite to the substrate in the stacking direction.

3. The optical connector module according to claim 1, wherein, when the positioning core is observed through the through-hole in the extension direction, the pair of reference surfaces are formed at positions that are line-symmetrical to each other with respect to a center line of the through-hole parallel to the stacking direction.

4. The optical connector module according to claim 1, wherein the pair of reference surfaces extend from a stacking surface of the first cladding on which the positioning core is stacked.

5. The optical connector module according to claim 1, wherein the pair of reference surfaces are formed as inner surfaces of the positioning core in a direction perpendicular to the extension direction and the stacking direction.

* * * * *